US007678877B2

(12) United States Patent
Yang et al.

(10) Patent No.: US 7,678,877 B2
(45) Date of Patent: Mar. 16, 2010

(54) PROCESS FOR THE SYNTHESIS OF POLYALKYLPHENOL ANTIOXIDANTS

(75) Inventors: Suizhou Yang, Lowell, MA (US); Ashok L. Cholli, Chelmsford, MA (US)

(73) Assignee: Polnox Corporation, Lowell, MA (US)

( * ) Notice: Subject to any disclaimer, the term of this patent is extended or adjusted under 35 U.S.C. 154(b) by 1105 days.

(21) Appl. No.: 11/292,813

(22) Filed: Dec. 2, 2005

(65) Prior Publication Data
US 2006/0128929 A1  Jun. 15, 2006

Related U.S. Application Data

(60) Provisional application No. 60/632,893, filed on Dec. 3, 2004.

(51) Int. Cl.
C08G 65/38 (2006.01)
C08G 65/40 (2006.01)
C08G 61/00 (2006.01)
C08G 61/02 (2006.01)

(52) U.S. Cl. .................. 528/219; 528/86; 528/210; 528/397; 528/495; 528/497

(58) Field of Classification Search .................. 528/86, 528/210, 219, 397, 495, 497
See application file for complete search history.

(56) References Cited

U.S. PATENT DOCUMENTS

| | | |
|---|---|---|
| 3,294,836 A | 12/1966 | Peterson et al. |
| 3,441,545 A | 4/1969 | Blatz et al. |
| 3,459,704 A | 8/1969 | Peterson et al. |
| 3,632,785 A | 1/1972 | Bornstein |
| 3,645,970 A | 2/1972 | Kleiner |
| 3,655,831 A | 4/1972 | Friedman |
| 3,907,939 A | 9/1975 | Robin et al. |
| 3,996,160 A | 12/1976 | Dale et al. |
| 3,996,198 A | 12/1976 | Wang et al. |
| 4,094,857 A | 6/1978 | Wolfe, Jr. |
| 4,098,829 A | 7/1978 | Weinshenker et al. |
| 4,202,816 A | 5/1980 | Moser et al. |
| 4,205,151 A | 5/1980 | Dale et al. |
| 4,213,892 A | 7/1980 | Scott |
| 4,219,453 A | 8/1980 | Sakurai et al. |
| 4,267,358 A | 5/1981 | Hechenbleikner et al. |
| 4,281,192 A | 7/1981 | Jacquet et al. |
| 4,283,572 A | 8/1981 | Klicker |
| 4,341,879 A | 7/1982 | Sugio et al. |
| 4,355,148 A | 10/1982 | Layer et al. |
| 4,377,666 A | 3/1983 | Farrar |
| 4,447,657 A | 5/1984 | Firth et al. |
| 4,465,871 A | 8/1984 | Firth et al. |
| 4,511,491 A | 4/1985 | Ishii et al. |
| 4,849,503 A | 7/1989 | Cotter et al. |
| 4,855,345 A | 8/1989 | Rosenberger et al. |
| 4,857,596 A | 8/1989 | MacLeay et al. |
| 4,900,671 A | 2/1990 | Pokora et al. |
| 4,925,591 A | 5/1990 | Nakauchi et al. |
| 4,968,759 A | 11/1990 | Kikuchi et al. |
| 4,977,004 A | 12/1990 | Bettle, III et al. |
| 5,013,470 A | 5/1991 | Benfaremo |
| 5,017,727 A | 5/1991 | Olivier |
| 5,117,063 A | 5/1992 | Stern et al. |
| 5,143,828 A | 9/1992 | Akkara et al. |
| 5,206,303 A | 4/1993 | Tse et al. |
| 5,207,939 A | 5/1993 | Farng et al. |
| 5,320,889 A | 6/1994 | Bettle, III |
| 5,449,715 A | 9/1995 | Plochocka et al. |
| 5,498,809 A | 3/1996 | Emert et al. |
| 5,574,118 A | 11/1996 | Olivier |
| 5,652,201 A | 7/1997 | Papay et al. |
| 5,834,544 A | 11/1998 | Lin et al. |
| 5,911,937 A | 6/1999 | Hekal |
| 5,994,498 A | 11/1999 | Tripathy et al. |
| 6,018,018 A | 1/2000 | Samuelson et al. |
| 6,150,491 A | 11/2000 | Akkara |
| 6,342,549 B1 | 1/2002 | Hirose et al. |
| 6,444,450 B2 | 9/2002 | Akkara et al. |
| 6,770,785 B1 | 8/2004 | Desai et al. |
| 6,828,364 B2 | 12/2004 | Gugumus |
| 7,223,432 B2 | 5/2007 | Cholli et al. |
| 2001/0041203 A1 | 11/2001 | Uno et al. |
| 2002/0128493 A1 | 9/2002 | Romanczyk, Jr. et al. |
| 2002/0183470 A1 | 12/2002 | Tripathy et al. |

(Continued)

FOREIGN PATENT DOCUMENTS

CS  111291  6/1964

(Continued)

OTHER PUBLICATIONS

Dordick, J.S., et al., "Polymerization of Phenols Catalyzed by Peroxidase in Nonaqueous Media," *Biotechnology and Bioengineering*, XXX: 31-36 (1987).

(Continued)

*Primary Examiner*—Duc Truong
(74) *Attorney, Agent, or Firm*—Hamilton, Brook, Smith & Reynolds, P.C.

(57) ABSTRACT

Disclosed is a method for the synthesis of sterically hindered polymeric antioxidants based on phenol type antioxidant monomers. The method includes partially etherifying, polymerizing and thermally rearranging a phenol containing monomer represented by the following structural formula:

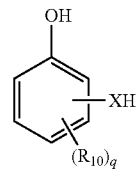

to produce a sterically hindered polymeric macromolecular antioxidant. X, $R_{10}$ and q are as defined herein. The disclosed method is a simple, direct and economical process for the synthesis of sterically hindered polymeric macromolecular antioxidants.

20 Claims, No Drawings

U.S. PATENT DOCUMENTS

| | | |
|---|---|---|
| 2003/0030033 A1 | 2/2003 | Duyck et al. |
| 2003/0191242 A1 | 10/2003 | Zedda et al. |
| 2003/0230743 A1 | 12/2003 | Cholli et al. |
| 2004/0164279 A1 | 8/2004 | Stevenson et al. |
| 2004/0180994 A1 | 9/2004 | Pearson et al. |
| 2004/0186167 A1 | 9/2004 | Dou et al. |
| 2004/0186214 A1 | 9/2004 | Li et al. |
| 2004/0198875 A1 | 10/2004 | Kaprinidis et al. |
| 2004/0214935 A1 | 10/2004 | Cholli et al. |
| 2005/0209379 A1 | 9/2005 | Botkin et al. |
| 2005/0238789 A1 | 10/2005 | Cholli et al. |
| 2006/0029706 A1 | 2/2006 | Cholli et al. |
| 2006/0040833 A1 | 2/2006 | Al-Akhdar et al. |
| 2006/0041087 A1 | 2/2006 | Cholli |
| 2006/0041094 A1 | 2/2006 | Cholli |
| 2006/0128930 A1 | 6/2006 | Dhawan et al. |
| 2006/0128931 A1 | 6/2006 | Kumar et al. |
| 2006/0128939 A1 | 6/2006 | Kumar et al. |
| 2006/0189824 A1 | 8/2006 | Kumar et al. |
| 2006/0233741 A1 | 10/2006 | Kumar et al. |
| 2007/0106059 A1 | 5/2007 | Cholli et al. |
| 2007/0135539 A1 | 6/2007 | Cholli et al. |
| 2007/0149660 A1 | 6/2007 | Kumar et al. |
| 2007/0154430 A1 | 7/2007 | Cholli et al. |
| 2007/0154608 A1 | 7/2007 | Cholli et al. |
| 2007/0154720 A1 | 7/2007 | Cholli et al. |
| 2007/0161522 A1 | 7/2007 | Cholli et al. |
| 2008/0249335 A1 | 10/2008 | Cholli et al. |
| 2008/0293856 A1 | 11/2008 | Kumar et al. |
| 2008/0311065 A1 | 12/2008 | Cholli |

FOREIGN PATENT DOCUMENTS

| | | |
|---|---|---|
| DE | 197 47 644 A1 | 5/1999 |
| DE | 198 43 875 A1 | 3/2000 |
| EP | 0 181 023 A1 | 5/1986 |
| EP | 0 289 077 A2 | 11/1988 |
| EP | 0 358 157 A1 | 3/1990 |
| EP | 0 404 039 A1 | 12/1990 |
| EP | 0 618 203 A1 | 10/1994 |
| EP | 0 688 805 A1 | 12/1995 |
| EP | 1 067 144 A1 | 1/2001 |
| EP | 1 468 968 A1 | 10/2004 |
| FR | 2 183 973 | 12/1973 |
| GB | 1 283 103 | 7/1972 |
| GB | 1 320 169 | 6/1973 |
| GB | 1 372 042 | 10/1974 |
| GB | 1 389 442 | 4/1975 |
| GB | 1 469 245 | 4/1977 |
| GB | 1 482 649 | 8/1977 |
| JP | 69002715 B | 1/1966 |
| JP | 43016392 B4 | 7/1968 |
| JP | 44024274 | 10/1969 |
| JP | 44028850 | 11/1969 |
| JP | 45 2980 | 1/1970 |
| JP | 49 29339 | 3/1974 |
| JP | 57085366 A | 5/1982 |
| JP | 59025814 | 2/1984 |
| JP | 59197447 | 11/1984 |
| JP | 60-199832 | 10/1985 |
| JP | 05 199858 | 8/1993 |
| JP | 06135876 A | 5/1994 |
| JP | 06 247959 | 9/1994 |
| JP | 08027226 A | 1/1996 |
| JP | 09262069 | 10/1997 |
| JP | 09 328519 | 12/1997 |
| JP | 09 328521 | 12/1997 |
| JP | 9322784 A | 12/1997 |
| JP | 11-80063 | 3/1999 |
| JP | 11-158103 | 6/1999 |
| JP | 2003138258 | 5/2003 |
| NL | 7 905 000 | 3/1980 |
| WO | WO 92/20734 | 11/1992 |
| WO | WO 00/39064 A1 | 7/2000 |
| WO | WO 01/18125 A1 | 3/2001 |
| WO | WO 01/48057 A1 | 7/2001 |
| WO | WO 02/079130 A1 | 10/2002 |
| WO | WO 03/087260 A1 | 10/2003 |
| WO | WO 03/102004 A1 | 12/2003 |
| WO | WO 2004/024070 A2 | 3/2004 |
| WO | WO 2004/050795 A2 | 6/2004 |
| WO | WO 2005/025513 A2 | 3/2005 |
| WO | WO 2005/025646 A2 | 3/2005 |
| WO | WO 2005/060500 A2 | 7/2005 |
| WO | WO 2005/070974 A2 | 8/2005 |
| WO | WO 2005/071005 A1 | 8/2005 |
| WO | WO 2006/018403 A1 | 2/2006 |
| WO | WO 2006/060801 A2 | 6/2006 |
| WO | WO 2006/104957 A2 | 10/2006 |
| WO | WO 2008/005358 | 1/2008 |

OTHER PUBLICATIONS

Kazandjian, R.Z., et al., "Enzymatic Analyses in Organic Solvents," *Biotechnology and* Bioengineering, XXVIII:417-421 (1986).

Klibanov, A.M., et al., "Enzymatic Removal of Toxic Phenols and Anilines from Waste Waters," *J. of Applied Biochemistry*, 2(5):414-421 (1980).

Ikeda, R., et al., "Novel Synthetic Pathway to a Poly(phenylene oxide). Laccase-Catalyzed Oxidative Polymerization of Syringic Acid," *Macromolecules*, 29:3053-3054 (1996).

Akkara, J.A., et al., "Synthesis and Characterization of Polymers Produced by Horseradish Peroxidase in Dioxane," *J. of Polymer Science: Part A: Polymer Chemistry*, 29(11):1561-1574 (1991).

Ayyagari, M.S., et al., "Controlled Free-Radical Polymerization of Phenol Derivatives by Enzyme-Catalyzed Reactions in Organic Solvents," *Macromolecules*, 28(15):5192-5197 (1995).

Ryu, K., et al., "Peroxidase-Catalyzed Polymerization of Phenols," Biocatalysis in Agricultural Biotechnology, Chapter 10:141-157 (1988).

Bruno, F.F., et al., "Enzymatic Template Synthesis of Polyphenol," Materials Research Society Symposium Proceedings vol. 600, Electroactive Polymers (EAP):255-259 (1999).

Akkara, J.A., et al., "Hematin-Catalyzed Polymerization of Phenol Compounds," Macromolecules, 33(7):2377-2382 (2000).

Dordick, J.S., "Enzymatic Catalysis in Monophasic Organic Dolvents," *Enzyme Microb. Technol.*, 11(4):194-211 (1989).

FS&T 821 "Food Lipids," [online], Oct. 2001 [retrieved on Oct. 29, 2002]. Retrieved from the Internet <URL: http://class.fst.ohio-state.edu/fst821/>.

FST 821 "Course Schedule," [online], [retrieved on Oct. 29, 2002]. Retrieved from the Internet <URL: http://class.fst.ohio-state.edu/fst821/>.

FS&T 821 "Antioxidant," [online], [retrieved on Oct. 29, 2002]. Retrieved from the Internet <URL: http://class.fst.ohio-state.edu/fst821/>.

Jialanella, G.and Pilrma, I., "Synthesis of Poly(vinyl alcohol-co-vinyl gallate) by the Chemical Modification of Poly(vinyl alcohol)," Polymer Bulletin 18:385-389 (1987).

Jayaprakasha, G.K., et al., "Antioxidant Activity of Grape Seed (*Vitis vinifera*) Extracts on Peroxidation Models In Vitro," *Food Chemistry*, 73:285-290 (2001).

Hidalgo, M.E., et al., "Antioxidant Activity of Depsides and Depsidones," Phytochemistry, 37(6):1585-1587 (1994).

Khan, K.M., et al., "An Expedient Esterification of Aromatic Carboxylic Acids Using Sodium Bromate and Sodium Hydrogen Sulfite," *Tetrahedron 59*(29):5549-5554 (2003).

March, J., Advanced Organic Chemistry, McGraw Hill Book Company, New York, pp. 251-259 (1977).

Mehdipour-Ataei, S., et al., "Novel Diols Containing Ester and Amide Groups and Resulting Poly(ester amide ester)s," *J. Applied Polymer Sci.*, 93:2699-2703 (2004), XP002420014.

Database Beilstein [online] Beilstein Institut Zur Förderung Der Chemischen Wissenschaften; XP002420027, Beilstein Registry No. 3517906.

Database Beilstein [online] Beilstein Institut Zur Förderung Der Chemischen Wissenschaften; XP002420028, Beilstein Registry No. 5840042.

Database Beilstein [online] Beilstein Institut Zur Förderung Der Chemischen Wissenschaften; XP002420029, Beilstein Registry No. 2311871.

Database Beilstein [online] Beilstein Institut Zur Förderung Der Chemischen Wissenschaften; XP002420030, Beilstein Registry No. 8876646.

Database Beilstein [online] Beilstein Institut Zur Förderung Der Chemischen Wissenschaften; XP002420031, Beilstein Registry No. 2271400.

Database Beilstein [online] Beilstein Institut Zur Förderung Der Chemischen Wissenschaften; XP002420032, Beilstein Registry No. 2212095.

Database Beilstein [online] Beilstein Institut Zur Förderung Der Chemischen Wissenschaften; XP002420033, Beilstein Registry No. 8941955.

Database Beilstein [online] Beilstein Institut Zur Förderung Der Chemischen Wissenschaften; XP002420034, Database Accession No. 2312425.

Database Beilstein [online] Beilstein Institut Zur Förderung Der Chemischen Wissenschaften; XP002420035, Beilstein Registry No. 905950.

Database Beilstein [online] Beilstein Institut Zur Förderung Der Chemischen Wissenschaften; XP002420036, Beilstein Registry No. 2140308.

Database Beilstein [online] Beilstein Institut Zur Förderung Der Chemischen Wissenschaften; XP002420037, Beilstein Registry No. 134886.

Database Beilstein [online] Beilstein Institut Zur Förderung Der Chemischen Wissenschaften; XP002420038, Beilstein Registry No. 1961007.

Database Caplus [online] Chemical Abstracts Service, Columbus, Ohio, US, XP-002387095, Database Accession No. 1981:572206, Effectiveness of Inhibitors in the Oxidation of Jet Fuel with an Initiator, abstract, Kovalev, et al.

Masada, H. and Oishi, Y., "A New Synthesis of aryl *t*-butyl Ethers," *Chem. Letters*, 57-58 (1978).

Ol'dekop, Yu. A., et al. "Simple Synthesis of the tert-butyl Ether of Phenol" Inst. Fiz-Org. Khim., Minsk, USSR. *Zhurnal Obshchei Khimii*, 50(2):475-6 (1980).

Masada, H., et al., "A New Method for the Williamson Ether Synthesis Using *t*-alkyl Halides in Nonpolar Solvents," *The Chemical Society of Japan*, 2:164-166 (1995).

Masada, H. et al., "A New Heterogeneous Williamson Synthesis of Ethers Using *t*-alkyl Substrates," *The Chemical Society of Japan* 3:275-282 (1996).

Tsvetkov, O.N., et al., "Alkylation of Phenols with Higher Olefins. Part I," *Int. Chem. Eng.* 7(1):104-121 (1967).

Sartori G., et al., "Highly Selective Mono-*tert*-butylation of Aromatic Compounds," *Chem. Ind.*, (London), (22):762-763 (1985).

Koshchii, V.A., et al. "Alkylation of Phenol by Alcohols in the Presence of Alumium Phenolate," *Org. Chem.* 24(7):1358-1361 (1988).

Chandra, K.G. and Sharma, M.M., "Alkylation of Phenol with MTBE and Other tert-butylethers:Cation Exchange Resins as Catalysts," *Catal. Lett.* 19(4):309-317 (1993).

Sakthivel, A., et al., "Vapour Phase Tertiary Butylation of Phenol Over Sulfated Zirconia Catalyst," *Catal. Lett.*, 72(3-4):225-228 (2001).

Quaschning, V., et al., "Properties of Modified Zirconia Used as Friedel-Crafts-Acylation Catalysts," *J. Catal.* 177:164-174 (1998).

Badamali, S.K., et al., "Influence of Aluminium Sources on the Synthesis and Catalytic Activity of Mesoporous AlMCM-41 Molecular Sieves," *Catal. Today* 63:291-295 (2000).

Heidekum, A., et al., "Nafion/Silica Composite Material Reveals High Catalytic Potential in Acylation Reactions," *J. Catal.* 188:230-232 (1999).

Kamitori, Y., et al., "Silica Gel as an Effective Catalyst for the Alkylation of Phenols and Some Heterocylic Aromatic Compounds," *J. Org. Chem.* 49: 4161-4165 (1984).

Armengol, E., et al., "Acid Zeolites as Catalysts in Organic Reactions, *tert*-Butylation of Anthracene, Naphthalene and Thianthrene," *Appl. Catal. A* 149:411-423 (1997).

Lalancette, J.M., et al.,, "Metals Intercalated in Graphite. II. The Friedel-Crafts Reactions with $ALCL_3$-Graphite," *Can. J. Chem.* 52:589-591 (1974).

Overgaag, M., et al., "Rearrangement of Alkyl Phenyl Ethers Over Dealuminated HY Zeolites Under Liquid-Phase Conditions," *Applied Catalysis A: General, Elsevier Sci.*, 175(1-2):139-146 (1998).

Devassy, B.M., et al., "Zirconia Supported Phosphotungstic Acid as an Efficient Catalyst for Resorcinol *tert*-Butylation and *n*-Heptane Hydroisomerization," *J. Mol. Catalysis A: Chemical* 221:113-119 (2004).

XP-002419239, "Discover Our World of Effects for Polyolefins," *Ciba Speciality Chemicals*, (2003).

Pirozhenko, V.V., et al., "NMR Study of Topomerization of *N*-Aroyl-*p*-Benzoquinonemonoimines," *Russian J. of Organic Chem.*, 31(11):1514-1519 (1995).

Coppinger, G.B., et al., "Photo-Fries Rearrangement of Aromatic Esters. Role of Steric and Electronic Factors" *J. of Phy. Chem.*, 70(11):3479-3489 (1966).

Spano, R., et al., "Substituted Anilides of 3-Monoethyl Ester of 4 Hydroxyisophthalic Acid," *J. of Med. Chem.*, 15(5):552-553 (1972).

Mejias, L., et al.,, "New Polymers From Natural Phenols Using Horseradish or Soybean Peroxidase," *Macromol. Biosci.*, 2:24-32 (2002).

Ismail, M.N. and Wazzan, A.A., "Evaluation of New Thermal Stabilizers and Antifatigue Agents for Rubber Vulcanizates," *Polymer-Plastics Tech. and Eng.*, 45:751-758 (2006).

Joossens, J., et al., "Diphenyl Phosphonate Inhibitors for the Urokinase-Type Plasminogen Activator: Optimization of the P4 Position," *J. Med. Chem.*, 49:5785-5793 (2006).

Belyaev, A., et al., "Structure-Activity Relationship of Diaryl Phosphonate Esters as Potent Irreversible Dipeptidyl Peptidase IV Inhibitors," *J. Med. Chem.*, 42:1041-1052 (1999).

Blokhin, Y.I, et al., "Phosphorylation of Dihydric Phenols with Amides of Phosphorous Acid," *Russian Chem. Bulletin*, 45(9):2250-2251 (1996).

Pätoprstý, V., et al., "$^{13}C$ NMR Study of 3,9-Di(alkylphenoxy)-2,4,8,10-tetraoxa-3,9-diphosphaspiro[5.5]undecanes," *Magnetic Resonance in Chem*, 23(2):122-126 (1985).

Singh, A. and Kaplan, D. L., "Biocatalytic Route to Ascorbic Acid-Modified Polymers for Free-Radical Scavenging," *Adv. Matter.*, 15(15):1291-1294 (2003).

Kim, T. H., et al., "Melt Free-Radical Grafting of Hindered Phenol Antioxidant onto Polyethylene," *J. Applied Polymer Science*, 77:2968-2973 (2000).

Faber, K., "Biotransformations in Organic Chemistry," A Textbook, Fourth Completely Revised and Extended Edition, Springer-Verlag pp. 347-349 (1953).

English Abstract of Kovalev, G. I., et al., "Study of the Effectiveness of Inhibitors in Oxidation of Jet Fuel in a Closed Volume," *Deposited Doc.*, VINITI: 443-82 (1981).

English Abstract of Kovalev, G.I., et al., "Effectiveness of Inhibitors in the Oxidation of Jet Fuel With an Initiator," *J. Neftekhimiya (Petroleum Chemistry)*, 21(2): 287-298 (1981).

Thompson, C.R., et al., "Stability of Carotene in Alfalfa Meal: Effect of Antioxidants," *Industrial and Engineering Chemistry*, Western Regional Research Laboratory, Albany, Calif., 42(5); 922-925 (May 1950).

Scharpe, S.L., et al., "Serine Peptidase Modulators, Their Preparation, and Their Therapeutic Use," Chemical Abstracts Service, ZCAPLUS, document No. 131:223514 (1999).

Maki, M., et al., "Weather-Resistant Colored Polypropylene," Chemical Abstracts Service, ZCAPLUS, document No. 89:111364 (1978).

Hofer, K., et al., "[[(Anilinooxalyl)amino]phenyl] Phosphite Stabilizers for Polypropylene," Chemical Abstracts Service, ZCAPLUS, document No. 77:62780 (1972).

Hatayama, K., et al., "Anti-ulcer Effect of Isoprenyl Flavonoids. III.[1] Synthesis and Anti-ulcer Activity of Metabolites of 2'-Carboxymethoxly-4,4'-bis(3-methyl-2-butenyloxy)chalcone[2)]," *Chemical & Pharmaceutical Bulletin*, 33(4), 1327-1333(Apr. 1985).

Ding, et al., "Chemical Trapping Experiments Support a Cation-Radical Mechanism for the Oxidative Polymerization of Aniline," Journal of Polymer Science, Part A: Polymer Chemistry, vol. 37: 2569-2579 (1999).

Circ-Marjanovic, et al., Chemical Oxidative Polymerization of Aminodiphenylamines, Journal of Physical Chemistry B, 112, 23: 6976-6987 (2008).

Li, et al., "Novel Multifunctional Polymers," Chemical Reviews, vol. 102, No. 9, pp. 5925-2943 (2002).

PROCESS FOR THE SYNTHESIS OF POLYALKYLPHENOL ANTIOXIDANTS

RELATED APPLICATION(S)

This application claims the benefit of U.S. Provisional Application No. 60/632,893, filed on Dec. 3, 2004. The entire teachings of the above application are incorporated herein by reference.

BACKGROUND OF THE INVENTION

Many polymeric antioxidants possess significantly higher antioxidant activities compared to corresponding small molecule antioxidants, along with improved thermal stability and performance in a wide range of materials, for example, plastics, elastomers, lubricants, petroleum based products (lubricants, gasoline, aviation fuels, and engine oils), cooking oil, cosmetics, processed food products, and the like.

The synthesis of polymeric phenol antioxidants (including sterically hindered polymeric phenol antioxidants) from substituted phenols, using a hydroxyl group protection/deprotection approach is described in patent applications to Cholli, et al., including U.S. Provisional Application No.: 60/370,468, U.S. Patent Application Publication No.: 2003/230743, International Patent Publication No.s: WO 2003/87260, and WO 2005/071005, and U.S. patent application Ser. No. 10/408,679 the entire teachings of each of which are incorporated herein by reference. These methods require multiple steps and purification of intermediates at each step. For example, WO 2003/87260 discloses a synthesis of poly (tert-butylhydroquinone) (poly(TBHQ)) that requires four separate steps, including separation of intermediate components at each step.

SUMMARY OF THE INVENTION

Disclosed is a method for the synthesis of sterically hindered polyalkylphenol antioxidants.

The methods of the present invention include the first step of partially etherifying a phenol derivative represented by the following structural formula:

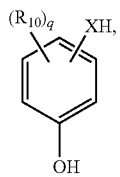

At least one ring carbon atom substituted with an —OH group is adjacent to one unsubstituted ring carbon atom. X is —O—, —NH— or —S—. Each $R_{10}$ is independently an optionally substituted C1-C10 alkyl group, an optionally substituted aryl group, and optionally substituted alkoxy group, an optionally substituted carbonyl group, an optionally substituted alkoxycarbonyl group, an optionally substituted aryloxycarbonyl group, —OH, —SH or —NH$_2$; or two $R_{10}$ groups on adjacent carbon atoms join together to form an optionally substituted aromatic ring or an optionally substituted carbocyclic or heterocyclic non-aromatic ring. q is an integer from 0 to 2.

The etherification is carried out with an alkyl halide, alcohol or olefin and produces an alkoxy phenol derivative represented by the following structural formula:

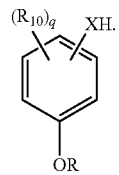

R is an optionally substituted C1-C10 alkyl group.

The methods of the present invention further include the second step of polymerizing the alkoxy phenol derivative to produce an alkoxy phenol polymer comprising at least one repeat unit selected from:

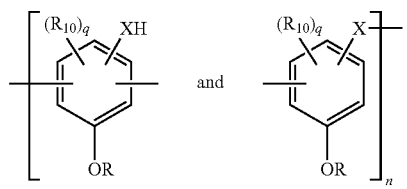

n is an integer greater than or equal to 2.

The methods further include the final step of thermally rearranging the alkyl portion of the alkoxy group of the polymer repeat units to the adjacent ring carbon atom to give a polymeric alkyl phenol derivative antioxidant comprising at least one repeat unit selected from:

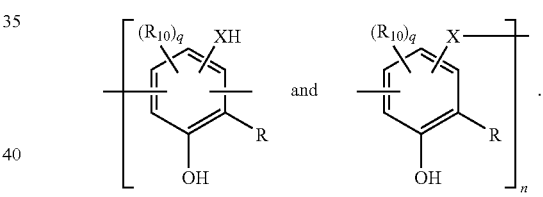

The present invention describes a simple, direct and economical process for the synthesis of polyalkylphenols as antioxidants. The methods of the invention allow for the cost effective synthesis of polymeric antioxidants. Polymeric antioxidants made by the methods of the present invention in general possess significantly higher antioxidant activities along with improved thermal stability and performance in a wide range of materials including but not limited to plastics, elastomers, lubricants, petroleum based products (lubricants, gasoline, aviation fuels, and engine oils), cooking oil, cosmetics, processed food products.

DETAILED DESCRIPTION OF THE INVENTION

A description of preferred embodiments of the invention follows.

The present invention is generally directed to methods of synthesizing sterically hindered phenol derived antioxidant polymers (polyalkylphenol antioxidants).

Sterically hindered, as used herein means that the substituent group (e.g., bulky alkyl group) on a ring carbon atom adjacent (or para) to a ring carbon atom substituted with a phenolic hydroxy group (or thiol or amine group), is large enough to sterically hinder the phenolic hydroxy group (or thiol or amine groups). This steric hinderance, in certain embodiments results in more labile or weak bonding between the oxygen and the hydrogen (or sulfur or nitrogen and hydrogen) and in turn enhances the stability and antioxidant activity (proton donating activity) of the sterically hindered antioxidant.

Such antioxidant polymers can be employed to inhibit the oxidation of an oxidizable material, for example by contacting the material with an antioxidant polymer made by the methods of the present invention.

For purposes of the present invention, a method of "inhibiting oxidation" is a method that inhibits the propagation of a free radical-mediated process. Free radicals can be generated by heat, light, ionizing radiation, metal ions and some proteins and enzymes. Inhibiting oxidation also includes inhibiting reactions caused by the presence of oxygen, ozone or another compound capable of generating these gases or reactive equivalents of these gases.

As used herein the term "oxidizable material" is any material which is subject to oxidation by free-radicals or oxidative reaction caused by the presence of oxygen, ozone or another compound capable of generating these gases or reactive equivalents thereof. In particular the oxidizable material is a lubricant or a mixture of lubricants.

Repeat units of the antioxidant polymers of the invention include substituted benzene molecules. These benzene molecules are typically based on phenol or a phenol derivative, such that they have at least one hydroxyl or ether functional group. In certain embodiments, the benzene molecules have a hydroxyl group. The hydroxyl group can be a free hydroxyl group and can be protected or have a cleavable group attached to it (e.g., an ester group). Such cleavable groups can be released under certain conditions (e.g., changes in pH), with a desired shelf life or with a time-controlled release (e.g., measured by the half-life), which allows one to control where and/or when an antioxidant polymer can exert its antioxidant effect. The repeat units can also include analogous thiophenol and aniline derivatives, e.g., where the phenol —OH can be replaced by —SH, —NH—, and the like.

Substituted benzene repeat units of an antioxidant polymer of the invention are also typically substituted with a bulky alkyl group or an n-alkoxycarbonyl group. In certain embodiments, the benzene monomers are substituted with a bulky alkyl group. In certain other embodiments, the bulky alkyl group is located ortho or meta to a hydroxyl group on the benzene ring, typically ortho. A "bulky alkyl group" is defined herein as an alkyl group that is branched alpha- or beta- to the benzene ring. In certain other embodiments, the alkyl group is branched alpha to the benzene ring. In certain other embodiments, the alkyl group is branched twice alpha to the benzene ring, such as in a tert-butyl group. Other examples of bulky alkyl groups include isopropyl, 2-butyl, 3-pentyl, 1,1-dimethylpropyl, 1-ethyl-1-methylpropyl and 1,1-diethylpropyl. In certain other embodiments, the bulky alkyl groups are unsubstituted, but they can be substituted with a functional group that does not interfere with the antioxidant activity of the molecule or the polymer. Straight chained alkoxylcarbonyl groups include methoxycarbonyl, ethoxycarbonyl, n-propoxycarbonyl, n-butoxycarbonyl and n-pentoxycarbonyl. N-propoxycarbonyl is a preferred group. Similar to the bulky alkyl groups, n-alkoxycarbonyl groups are optionally substituted with a functional group that does not interfere with the antioxidant activity of the molecule or the polymer.

In certain embodiments, methods of the present invention include the first step of partially etherifying the phenol derivative represented by the following structural formula:

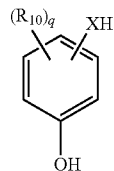

1 wherein at least one ring carbon atom substituted with an —OH, —SH or $NH_2$ group (e.g., >C—OH) is adjacent (or ortho) to one unsubstituted ring carbon atom (>C—H). In certain embodiments at least one ring carbon atom substituted with an —OH, —SH or $NH_2$ group (e.g., >C—OH) is meta or para to one unsubstituted ring carbon atom (>C—H). X is —O—, —NH— or —S—. In certain embodiments X is —O—. Each $R_{10}$ is independently an optionally substituted C1-C10 alkyl group, an optionally substituted aryl group, and optionally substituted alkoxy group, an optionally substituted carbonyl group, an optionally substituted alkoxycarbonyl group, an optionally substituted aryloxycarbonyl group, —OH, —SH or —$NH_2$ or two $R_{10}$ groups on adjacent carbon atoms join together to form an optionally substituted aromatic ring or an optionally substituted carbocyclic or heterocyclic non-aromatic ring. Additionally, when two $R_{10}$ groups on adjacent carbon atoms join together to form an optionally substituted aromatic ring or an optionally substituted carbocyclic or heterocyclic non-aromatic ring, the optionally substituted aromatic ring or an optionally substituted carbocyclic or heterocyclic non-aromatic ring may be further fused to another (i.e., a third) optionally substituted aromatic ring or an optionally substituted carbocyclic or heterocyclic non-aromatic ring. q is an integer from 0 to 2.

In certain embodiments, in structural formula 1, each $R_{10}$ is independently C1-C10 alkyl group, —OH, —SH or —$NH_2$, or two $R_{10}$ groups on adjacent carbon atoms join together to form an optionally substituted aromatic ring or an optionally substituted carbocyclic or heterocyclic non-aromatic ring. In certain other embodiments, two $R_{10}$ groups on adjacent carbon atoms join together to form an optionally substituted non-aromatic heterocyclic ring. In certain embodiments the optionally substituted non-aromatic heterocyclic groups is optionally substituted tetrahydropyranyl or optionally substituted dihydropyranyl. In certain other embodiments the non-aromatic heterocyclic ring is optionally substituted with one or more substituents selected from the group =O, —OH, C1-C4 alkyl, optionally substituted aryl, —OC(O)(C1-C4 alkyl), —OC(O)(aryl), —OC(O)(substituted aryl), —OC(O)(aralkyl), and —OC(O)(substituted aralkyl).

As used herein an unsubstituted ring carbon atom, is a ring carbon atom which is bonded to a hydrogen atom.

In one embodiment, the phenol derivative is represented by:

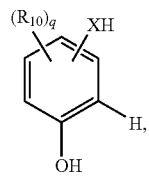

$R_{10}$, X and q are as described above.

In certain embodiments, the methods of the present invention comprises partially etherifying an optionally substituted phenol derivative (for example, hydroquinone). In certain embodiments the optionally substituted phenol derivative is represented by one of the following structural formulas:

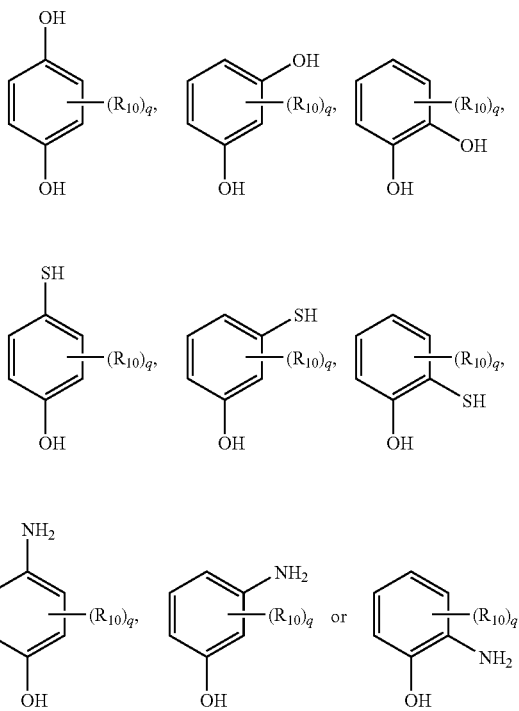

In certain embodiments, the optionally substituted phenol derivative is represented by one of the following structural formulas:

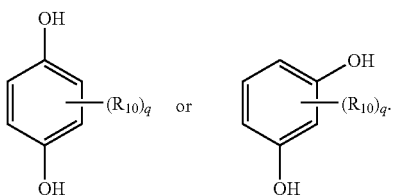

In certain embodiments, the optionally substituted phenol derivative is represented by the following structural formula:

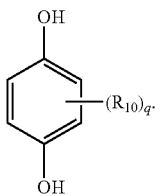

$R_{10}$ and q are as defined above. Preferably each $R_{10}$ is independently selected from the groups comprising an optionally substituted C1-C10 alkyl group, an optionally substituted aryl group, an optionally substituted alkoxy group, an optionally substituted alkoxycarbonyl group, an optionally substituted aryloxycarbonyl group, —OH, —SH or —NH$_2$. More preferably each $R_{10}$ is independently selected from the groups comprising a tertiary alkyl group (e.g., tert-butyl), an alkoxy carbonyl group or a hydroxy group. q is preferably 0 or 1.

In certain embodiments each $R_{10}$ is independently an optionally substituted C1-C10 alkyl group, an optionally substituted aryl group, and optionally substituted alkoxy group, an optionally substituted carbonyl group, an optionally substituted alkoxycarbonyl group, an optionally substituted aryloxycarbonyl group, —OH, —SH or —NH$_2$ or two $R_{10}$ groups on adjacent carbon atoms join together to form an optionally substituted aromatic ring or an optionally substituted carbocyclic or heterocyclic non-aromatic.

In certain embodiments, each $R_{10}$ is independently C1-C10 alkyl group, —OH, —SH or —NH$_2$, or two $R_{10}$ groups on adjacent carbon atoms join together to form an optionally substituted aromatic ring or an optionally substituted carbocyclic or heterocyclic non-aromatic ring. In certain other embodiments, two $R_{10}$ groups on adjacent carbon atoms join together to form an optionally substituted non-aromatic heterocyclic ring. In certain embodiments the optionally substituted non-aromatic heterocyclic groups is optionally substituted tetrahydropyranyl or optionally substituted dihydropyranyl. In certain other embodiments the non-aromatic heterocyclic ring is optionally substituted with one or more substituents selected from the group =O, —OH, C1-C4 alkyl, optionally substituted aryl, —OC(O)(C1-C4 alkyl), —OC(O)(aryl), —OC(O)(substituted aryl), —OC(O)(aralkyl), and —OC(O)(substituted aralkyl).

In certain embodiments, the optionally substituted phenol derivative is represented by the following structural formula:

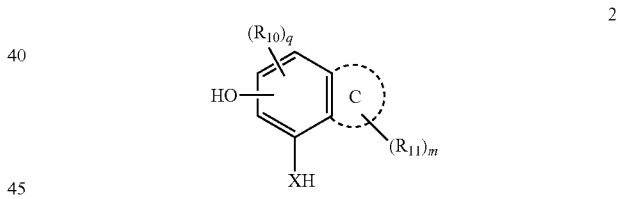

In certain embodiments, Ring C is s five or six membered aromatic or carbocyclic or heterocyclic non-aromatic ring. In certain other embodiments Ring C is a non-aromatic heterocyclic ring. In certain embodiments Ring C is tetrahydropyranyl or dihydropyranyl.

In certain embodiments each $R_{10}$ is independently C1-C10 alkyl group, —OH, —SH or —NH$_2$. q is 0 or 1.

In certain other embodiments $R_{11}$ is =O, —OH, C1-C3 alkyl, optionally substituted aryl, —OC(O)(C1-C3 alkyl), —OC(O)(aryl), —OC(O)(substituted aryl), —OC(O)(aralkyl), or —OC(O)(substituted aralkyl). In certain other embodiments $R_{11}$ is =O, —OH, optionally substituted aryl or —OC(O)(aryl), —OC(O)(substituted aryl). In certain other embodiments $R_{11}$ is =O, —OH, optionally substituted phenyl or —OC(O)(phenyl), —OC(O)(substituted phenyl). In certain other embodiments $R_{11}$ is =O, —OH, phenol, benzene-diol (pyrocatechol), benzene-triol, —OC(O)(phenol), —OC(O)(benzene-diol), or —OC(O)(benzene-triol,).

m is an integer from 0 to 3.

In certain embodiments, the phenol derivative is represented by the following structural formula:

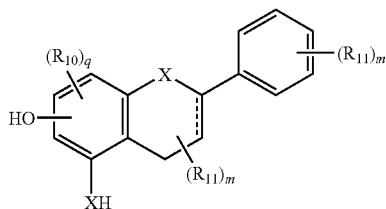

The variables are as described above for structural formula 2. The dashed line represents a double or single bond.

In certain embodiments, optionally substituted phenol derivative is represented by the following structural formula:

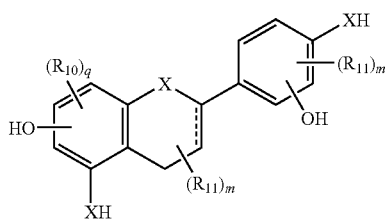

The variables are as described above for structural formula 2. The dashed line represents a double or single bond.

In certain embodiments, the variables and descriptions for the optionally substituted phenol derivatives (phenol derivatives) described herein are as described above for structural formula 1.

In certain other embodiments the alkyl group which is added to the optionally substituted phenol derivative by etherification comprises a secondary or tertiary group comprising more than 3 carbon atoms. Preferably the alkyl group is a tertiary butyl group.

In certain embodiments the alkyl halide, alcohol or olefin (alkene) used for etherification can be selected from: alcohols (e.g., t-butanol, isobutanol etc.), alkenes (e.g., isobutene, styrene, diisobutylene, etc.,), alkyl halides (e.g., 2-chloro-2-methylpropane, 2-bromo-2-methylpropane, 2-iodo-2-methylpropane, benzyl chloride, t-butyl chloride etc.).

Partially etherifying or mono-etherifying, as used herein means etherification at only one hydroxy substituent on the benzene ring. In the methods of the present invention the etherification step results in etherification of at least 50%, at least 60%, at least 70%, least 80%, at least 90% at least 95%, at least 99% or at least 100% of one hydroxy group on each benzene ring, In certain embodiments the etherification step results in etherification of 100% of one hydroxy group on each benzene ring, leaving the other functional (e.g., —OH, —SH or —NH$_2$) free for polymerization.

In certain embodiments of the present invention the etherification of the phenol derivative (e.g., hydroquinone, resorcinol and the like) is carried out in the presence of, for example, an alkyl halide (for example a tertiary alkyl halide, such as, 2-bromo-2-methylpropane, 2-chloro-2-methyl propane and 2-iodo-2-methylpropane etc.), an alcohol (for example a tertiary alcohol e.g., tert-butanol) or a corresponding olefin (such as isobutylene or propylene) in the presence of appropriate catalysts.

In certain embodiments of the present invention partial etherification is carried out in the presence of appropriate catalysts. In certain embodiments, when etherification is carried out in the presence of an alcohol or olefin, the catalysts is, for example, a strong inorganic acid, such as, hydrochloric acid, hydrobromic acid, sulfuric acid etc., a cationic exchange resin bearing sulfonic acid groups, metal halides, such as, aluminium chloride, zinc chloride and other acids. In certain other embodiments, when etherification is carried out in the presence of an alkyl halide the catalyst are, for example, a base, such as, pyridine, aliphatic amine (triethyl amine, trimethyl amine, diethyl amine etc.) and the like. The ratio of catalyst to monomer may vary from 0.1 to 100% with respect to the monomer.

In certain embodiment, for the etherification in the presence of an alcohol or olefin, the reaction can be carried out without or with solvent. Organic solvents are typically polar solvents such as acetone, dioxane, tetrahydrofuran and so on. The temperature can be at about 0° C. or at elevated temperatures, such as from about 30 to 100° C. or from about 50 to 80° C. For the reaction without solvent, the temperature can be from 100 to 400° C. or from 150 to 300° C. or even higher.

In certain embodiment, for the etherification in the presence of an alkyl halide, the reaction can be carried out with solvents such as dimethylformamide, dioxane, acetonitrile, and diethyl ether. The temperature can be ranged from below 0° C. to elevated temperature of the system. The temperature can be at about 0° C. or at elevated temperatures, such as from about 30 to 100° C. or from about 50 to 80° C.

In certain embodiments to get high yield of mono-etherification product, the molar ratio of alcohol or olefin or alkyl halide with hydroquinone or resorcinol or the like should be more than 1, from 10:1 to 1:1, prefer 5:1 to 2:1.

In certain embodiments etherification of the optionally substituted phenol derivative results in an alkoxy phenol derivative represented by S:

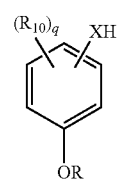

$R_{10}$, R, X, and q are as defined above. In certain embodiments wherein at least one ring carbon atom substituted with the —OR (or —NHR or —SR) group (e.g., >C—OR) is adjacent (or ortho) to one unsubstituted ring carbon atom (>C—H). In certain embodiments wherein at least one ring carbon atom substituted with the —OR (or —NHR or —SR) group (e.g., >C—OR) is meta or para to one unsubstituted ring carbon atom (>C—H).

R is an optionally substituted C1-C10 alkyl group. Preferably R is a tert-butyl group.

In certain embodiments etherification can be carried out as described above to produce an aryloxy phenol derivative represented by S in which R is an optionally substituted aryl group.

In certain embodiments, the alkoxy phenol derivate is polymerized to produce a polymer represented by Structural Formula T.

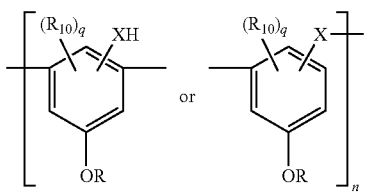

$R_{10}$, R, X, n and q are as defined above. In certain embodiments at least one ring carbon atom substituted with the —OR (or —NHR or —SR) group (e.g., >C—OR) is adjacent (or ortho) to one unsubstituted ring carbon atom (>C—H). In certain embodiments wherein at least one ring carbon atom substituted with the —OR (or —NHR or —SR) group (e.g., >C—OR) is meta or para to one unsubstituted ring carbon atom (>C—H).

An oxidative polymerization catalyst is added along with an oxidant, e.g., hydrogen peroxide or organic peroxide to convert the monomer to a polymer.

As used herein the oxidant serves as a substrate for the catalyst. The oxidative polymerization catalyst and oxidant combined facilitate the oxidation of the monomer to form a polymer.

Polymerization of the monomers can be catalyzed by a natural or synthetic enzyme or an enzyme mimetic capable of polymerizing a substituted benzene compound in the presence of hydrogen peroxide, where the enzyme or enzyme mimetic typically have a heme or related group at the active site. One general class of enzymes capable of catalyzing this reaction can be commonly referred to as the peroxidases. Horseradish peroxidase, soybean peroxidase, *Coprinus cinereus* peroxidase, and *Arthromyces ramosus* peroxidase are readily available peroxidases. Other enzymes capable of catalyzing the reaction include laccase, tyrosinase, and lipases. Suitable enzymes are able to catalyze the formation of a carbon-carbon bond and/or a carbon-oxygen-carbon bond between two aryl (e.g., phenyl, phenol) groups when a peroxide (e.g., hydrogen peroxide or an organic peroxide) can be present. A subunit or other portion of a peroxidase can be acceptable, provided that the active site of the enzyme can be still functional. Enzyme mimetics typically correspond to a part of an enzyme, so that they can carry out the same reaction as the parent enzyme but are generally smaller than the parent enzyme. Also, enzyme mimetics can be designed to be more robust than the parent enzyme, such as to be functional under a wider variety of conditions (e.g., different pH range, aqueous, partically aqueous and non-aqueous solvents) and less subject to degradation or inactivation. Suitable enzyme mimetics include hematin, tyrosinase-model complexes and iron-salen complexes. Hematin, in particular, can be functionalized to allow it to be soluble under a wider variety of conditions is disclosed in U.S. application Ser. No. 09/994,998, filed Nov. 27, 2001, the entire teachings of which are incorporated herein by reference.

Polymerizations of the present invention can be carried out under a wide variety of conditions. The pH can be often between about pH 1.0 and about pH 12.0, typically between about pH 6.0 and about pH 11.0. The temperature can be above about 0° C., such as between about 0° C. and about 100° C., 0° C. and about 45° C. or between about 15° C. and about 30° C. (e.g., room temperature). The solvent can be aqueous (preferably buffered), organic, or a combination thereof. Organic solvents are typically polar solvents such as ethanol, methanol, isopropanol, dimethylformamide, dioxane, acetonitrile, and diethyl ether. The concentration of monomer or comonomers can be typically 0.001 M or greater. Also, the concentration of buffer can be typically 0.001 M or greater. The polymerization reaction is typically carried out for between 1 and 48 hours, between 10 and 40 hours, between 15 and 35 hours, or between 20 and 30 hours.

Polymerizations of the invention use a catalytic amount of one of the enzymes or enzyme mimetics described above, which can be between about one unit/mL and five units/mL, where one unit can form 1.0 mg purpurogallin from pyrogallol in 20 seconds at pH 6.0 at 20° C. Preferably, the enzyme or enzyme mimetic can be added to the solution after addition of the antioxidant monomer or comonomers. A peroxide can be then added incrementally to the reaction mixture, such as not to de-activate the enzyme or enzyme mimetic, until an amount approximately stoichiometric with the amount of antioxidant monomer or comonomers has been added.

Although the enzyme or enzyme mimetic can be responsible for formation of phenol-based free radicals needed for chain propagation, the coupling of radicals to form a polymer chain can be controlled by the phenoxy radical and solvent chemistries. Further details regarding the coupling of phenoxy radicals can be found in "Enzymatic catalysis in monophasic organic solvents," Dordick, J. S., *Enzyme Microb. Technol.* 11:194-211 (1989), the contents of which are incorporated herein by reference. Coupling between substituted benzene monomers typically occurs ortho and/or para to a hydroxyl group. Coupling rarely occurs meta to a hydroxyl group.

Polymerization preferably results in the formation of C—C bonds. Preferred polymers can contain at least about 95% C—C bonds, at least about 90% C—C bonds, at least about 80% C—C bonds, at least about 70% C—C bonds, at least about 60% C—C bonds or at least about 50% C—C bonds. Especially preferred polymers contain about 100% C—C bonds. The remaining bonds are typically C—O—C bonds.

In certain embodiments of the present invention addition of biocatalyst or biomimatic [horseradish peroxidase (HRP), soybean peroxidase, Iron(II)-salen, hematin, and other peroxidases] and hydrogen peroxide (drop wise addition) to the reaction mixture results in the polymerization of the monomer.

In certain other embodiments the polymerization is carried out in the presence of an inorganic or organometallic catalyst, such as ferric chloride, ammonium persulphate, Iron(III) chloride, Iron(III) bromide, aluminum chloride, zinc chloride, TEMPO, AIBN, bis(cyclopentadienyl)titanium dichloride, 2.di-alkyl-aluminimum, chloride compounds, 3.triethyl aluminum and titanium tetra chloride, 4.Bis-Cyclopentadienyl, Zirconium Dichloride and 5 Ta(CH-t-Bu)(CH2-t-Bu)$_3$.

In various embodiments, the monomer for the polymerization can be, for example, a derivative of phenol, aniline, benzenethiol, hydroquinone, mono-protected hydroquinone, aminophenol, 4-aminophenol, phloroglucinol, querectin, epicatechin, epigallocatechin, epicatechingallate and any other polyphenolic, hydroxyl-aniline and hydroxyl-benezethiol system having at least one free ortho-position relative to the phenolic hydroxyl, and their combinations.

In various embodiments, the polymerization can be through, for example, a derivative of phenol, aniline and benzenethiol systems and their combinations.

In certain embodiments the present invention is a method for the synthesis of the macromolecules where the monomer for the polymerization could be, but is not limited to hydroquinone, mono-protected hydroquinone, 4-aminophenol, phloroglucinol, querectin, epicatechin, epigallocatechin, epicatechingallate and any other polyphenolic, hydroxyl-aniline and hydroxyl-benezethiol system having at least one free ortho-position with respect to the phenolic hydroxyl and their combinations.

In certain embodiments of the present invention the alkyl (or aryl) portion of the phenyl ether in the resulting poly (alkoxy phenol derivative) (or poly(aryloxy phenol derivative) is thermally rearranged to the ortho position. In certain embodiments the rearrangement occurs at elevated temperatures. In certain other embodiment the rearrangement occurs in the presence of a rearrangement catalyst. In certain embodiments the rearrangement creates an isomeric ortho polymeric alkyl (or aryl) phenol derivative antioxidant represented by Structural Formula U.

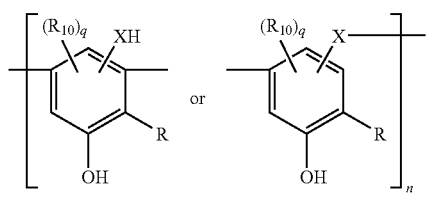

$R_{10}$, R, X, n and q are as defined above.

As used herein thermal rearrangement is the displacement of the alkyl (or aryl) portion of an alkoxy (or aryloxy) group to the adjacent ring carbon atom under elevated temperatures. As used herein elevated temperatures include from about 50° C. to bout 200° C. with alumina as a rearrangement catalyst, typically from about 65° C. to about 150° C.

In the methods of the present invention the thermal rearrangement results in displacement of at least 50%, at least 60%, at least 70%, least 80%, at least 90% at least 95%, at least 99% or at least 100% of the alkyl (or aryl) portion of the alkoxy (or aryloxy) group to the adjacent ring carbon atom. In certain embodiments the higher the displacement, the better—antioxidant properties of the polymer.

In certain embodiments, the rearrangement catalyst can be for example, hydrofluoric acid, silica gel, zeolites and the like. The solvents used for thermal rearrangement normally should be inert to the catalyst. Examples of suitable solvents include toluene, xylene, hexane, heptane and the like. The ratio of catalyst may vary from 0.1 to 100% by weight with respect to the ether unit to be rearranged.

In certain embodiments, for the optionally substituted phenol derivatives (phenol derivatives) described herein the ring carbon atom substituted with an —OH, —SH or $NH_2$ or an —OR group (>C—OR) is not adjacent (or ortho) to one unsubstituted ring carbon atom (>C—H). In certain embodiments the polymers made by the present invention do not have a bulky alkyl group or aryl group adjacent to the —OH, —SH or $NH_2$ or —OR —SR or —NHR group. In certain embodiments, in the polymers made by the methods of the present invention the bulky alkyl or aryl group is meta or para to the —OH, —SH or $NH_2$ or OR —SR or —NHR group. Without wishing to be bound by any theory it is believe that presence of the bulky group ortho, meta or para to a hydroxy group (or amino or thiol group) increases the antioxidant activity of the compound. Preferably the bulky group is ortho to the hydroxy group (or amino or thiol group).

In certain embodiments the synthesis is represented as follows:

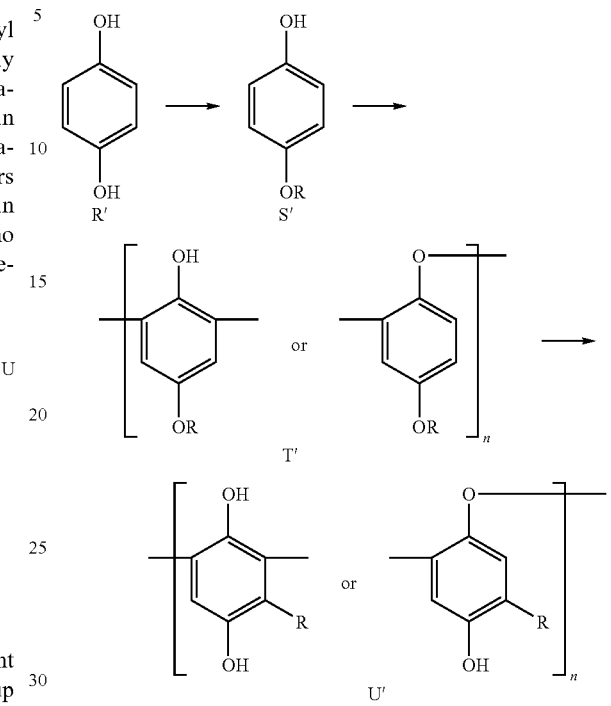

R is a C1-C10 alkyl group, an aryl group, or a benzyl group. In certain embodiments, R is a tertiary butyl group.

In certain embodiments the method comprises partially etherifying a phenol derivative (for example, hydroquinone) R with an alkyl halide, an alcohol (for example a tertiary alcohol) or a corresponding olefin in the presence of appropriate catalysts. The resulting alkoxy phenol derivative S is polymerized using a biocatalyst or biomimetic catalyst to produce a polymer represented by Structural Formula T. Finally, the alkyl portion of the phenyl ether in the resulting poly(alkoxy phenol derivative) is thermally rearranged to the ortho position in the presence of a rearrangement catalyst to give a polymeric alkyl phenol derivative antioxidant represented by Structural Formula U.

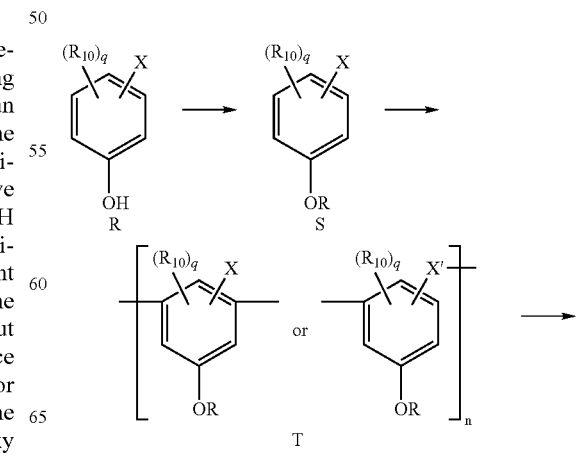

-continued

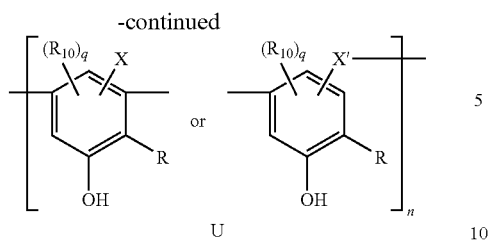

In Structural Formulas S, T, and U, n is an integer equal or greater than 2. X is —OH, —SH or —NH$_2$. X' is —O—. —S—OR—NH—. R is an optionally substituted C1-C10 alkyl group or an optionally substituted aryl group. Each R$_{10}$ is independently an optionally substituted C1-C10 alkyl group, an optionally substituted aryl group, and optionally substituted alkoxy group, an optionally substituted carbonyl group, an optionally substituted alkoxycarbonyl group, an optionally substituted aryloxycarbonyl group, —OH, —SH or —NH$_2$ an optionally substituted aromatic ring or an optionally substituted carbocyclic or heterocyclic non-aromatic ring. q is an integer from 0 to 2.

In a specific embodiment, the antioxidant polymer prepared by the methods of the present invention is represented by one or both of Structural Formulas (Ia)-(Id), and (IIa)-(IId):

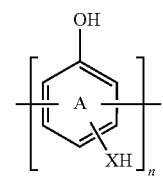

Ia

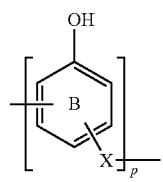

IIa

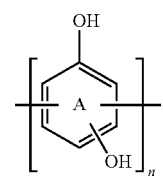

Ib

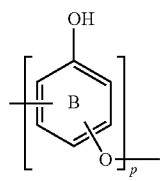

IIb

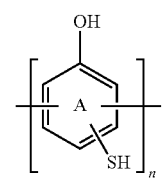

Ic

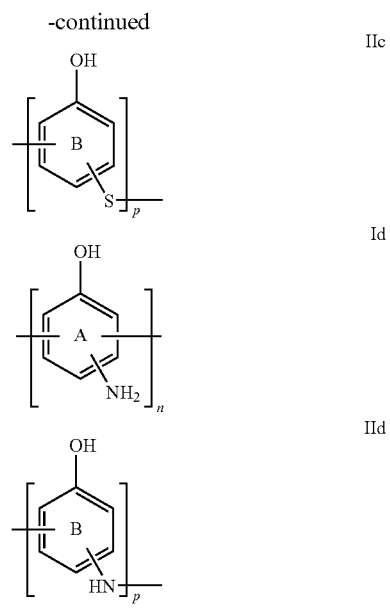

IIc

Id

IId

Ring A is substituted with at least one bulky alkyl group preferably a tert-butyl group ortho to the phenolic hydroxy group, and ring A is optionally further substituted with one or more groups selected from a substituted or unsubstituted alkyl or aryl group and a substituted or unsubstituted alkoxycarbonyl group. Ring A is further optionally fused to at least one more optionally substituted aromatic or optionally substituted non-aromatic carbocyclic or heterocyclic group.

Ring B is substituted with at least one —H and at least one bulky group preferably a tert-butyl group ortho to the phenolic hydroxy group, and ring B is further optionally substituted with one or more groups selected from a substituted or unsubstituted alkyl or aryl group and a substituted or unsubstituted alkoxycarbonyl group. Ring B is further optionally fused to at least one more optionally substituted aromatic or optionally substituted non-aromatic carbocyclic or heterocyclic group.

In various embodiments, the alkyl groups substituting Rings A and B can be, for example, secondary and tertiary alkyl groups containing 3 to 10 carbon atoms, typically between 3 and 6. In some embodiments, the alkyl groups are tertiary butyl groups.

X is —O—, —S— or —NH—.

n is an integer equal to or greater than 2; and p is an integer equal to or greater than 0, wherein the sum of n and p is an integer greater than or equal to 2.

In another embodiment, the antioxidant polymer prepared by the methods of the present invention is represented by one or both of Structural Formulas (I), and (II):

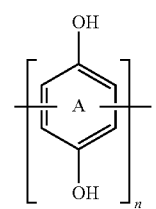

I

-continued

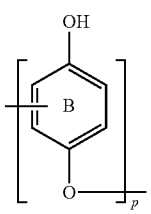
(II)

where:
Ring A, Ring B, p and n are as described above

Preferred polymers synthesized by the methods of the present invention include repeat units represented by one or both of Structural Formulas (IIIa) and (IVa):

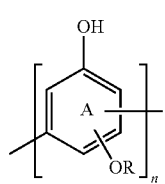
(IIIa)

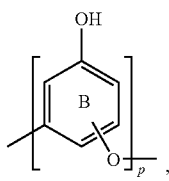
(IVa)

where Rings A and B are substituted as described above and n and p are as defined above.

Preferably, Ring A and Ring B in Structural Formulas (I) to (IV) are each substituted with at least one tert-butyl group located adjacent to the —OH.

R is —H or —CH$_3$.

Preferred polymers synthesized by the methods of the present invention include repeat units represented by one or both of Structural Formulas (III) and (IV):

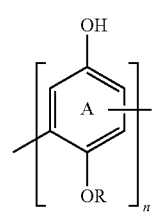
(III)

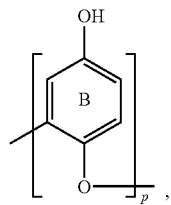
(IV)

where Rings A and B are substituted as described above and R, n and p are as defined above.

The polymers made by the methods of the present invention can include repeat units represented by one or more of Structural Formulas (Va), (Vb), (Vc), (VIa), (VIb) and (VIc):

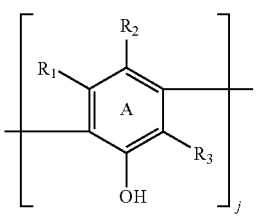
(Va)

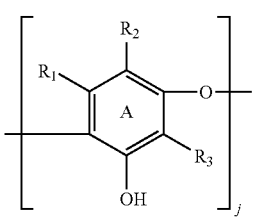
(Vb)

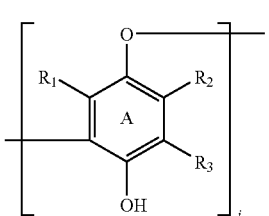
(Vc)

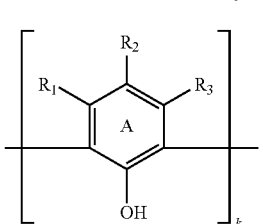
(VIa)

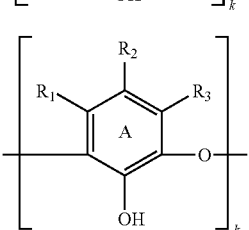
(VIb)

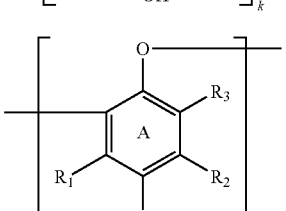
(VIc)

Where $R_1$, $R_2$ and $R_3$ are independently selected from the group consisting of —H, —OH, —NH, —SH, a substituted or unsubstituted alkyl or aryl group, and a substituted or unsubstituted alkoxycarbonyl group, additional values for $R_1$, $R_2$ and $R_3$ include carboxy and carbonyl. Preferably at least one of $R_1$, $R_2$ and $R_3$ is a tert-butyl group. Preferably the tert-butyl group is adjacent to an —OH group; and j and k are independently integers of zero or greater, such that the sum of j and k is equal to or greater than 2. In certain embodiments, in structures Va and VIa at least one of $R_1$, $R_2$ and $R_3$ are independently —OH, —NH, —SH.

R is —H or —CH$_3$.

In a specific embodiment, R is —H or —CH$_3$; $R_2$ is —H, —OH, or a substituted or unsubstituted alkyl group; or both. Preferably R is —H.

Specific examples of repeat units included in polymers of the present invention are represented by one of the following structural formulas:

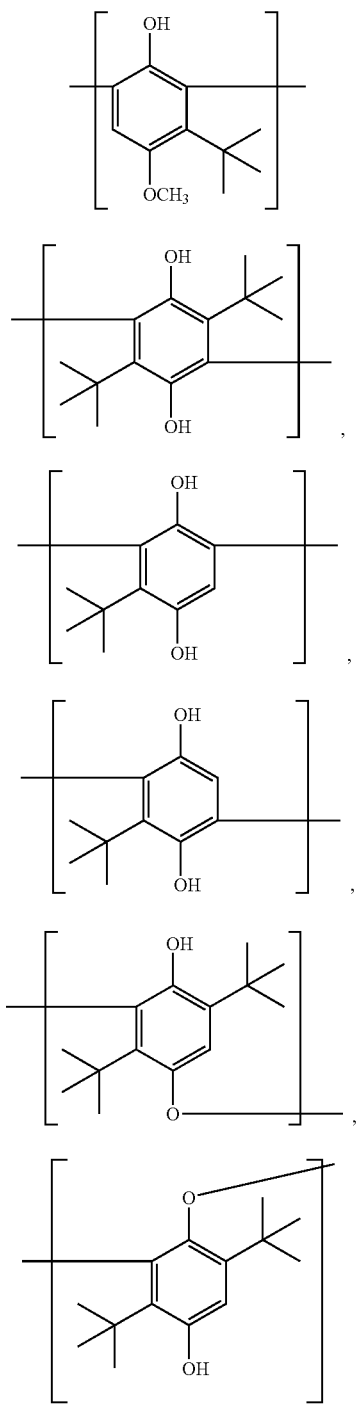

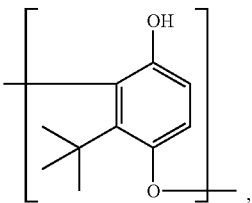

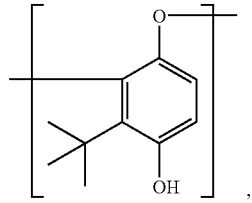

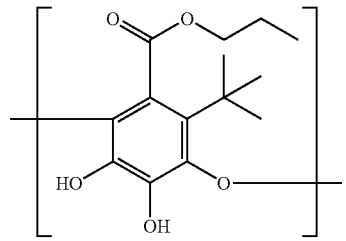

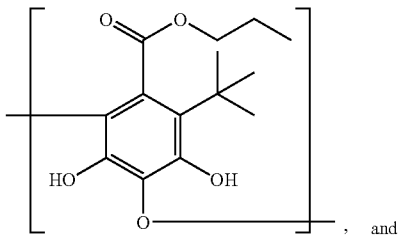

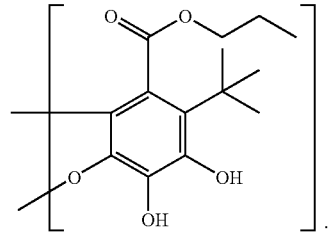

Advantageously, a polymer made by the methods of the present invention consists of repeat units represented by one or more of Structural Formulas (VII) to (XVIII).

Antioxidant polymers made by the methods of the present invention are prepared by polymerizing a molecule represented by Structural Formula (XIX):

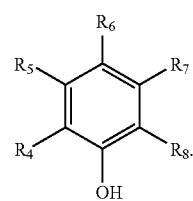

In certain embodiments, XIX R$_5$-R$_8$ are independently selected from —OH, —SH, —NH$_2$, or —OH, —SH, —NH$_2$ wherein one hydrogen atom is replaced with a protecting group selected from alkyl, alkoxy, benzyl, benzoyl, THP, carbonate, acetal, ketal, tretyl, dimethoxytretyl, trimethoxytretyl, silyl etc. Preferably, a molecule represented by Structural Formula (XIX) has one, two, three, four or five of the following features. In the first feature, at least one of R$_5$-R$_8$ are independently selected from —OH, —SH, —NH$_2$ and at least one of R$_5$, R$_7$ and R$_8$ is a tert-butyl group. In the second feature, R$_4$ is —H. In the third feature, one or both of R$_7$ and R$_8$ is —H. In the fourth feature, R is —H or —CH$_3$. In the fifth feature, R$_6$ is —H, —OH or a substituted or unsubstituted alkyl group. More preferably, a molecule represented by Structural Formula (XIX) has the first and second features; the first, second and third features; the first, second, third and fourth features; or the first, second, third, fourth and fifth features.

Specific examples of monomers that can be polymerized to form an antioxidant polymer of the present invention are represented by one of the following structural formulas:

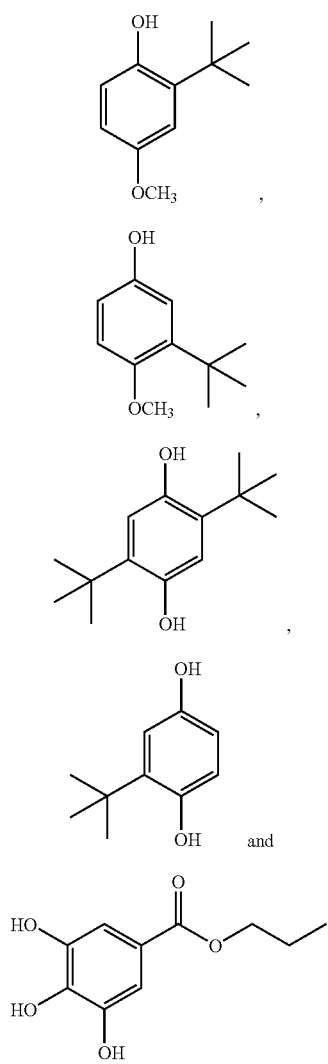

Other examples of specific monomers that can be polymerized to form an antioxidant polymer of the present invention are represented by one of the following structural formulas:

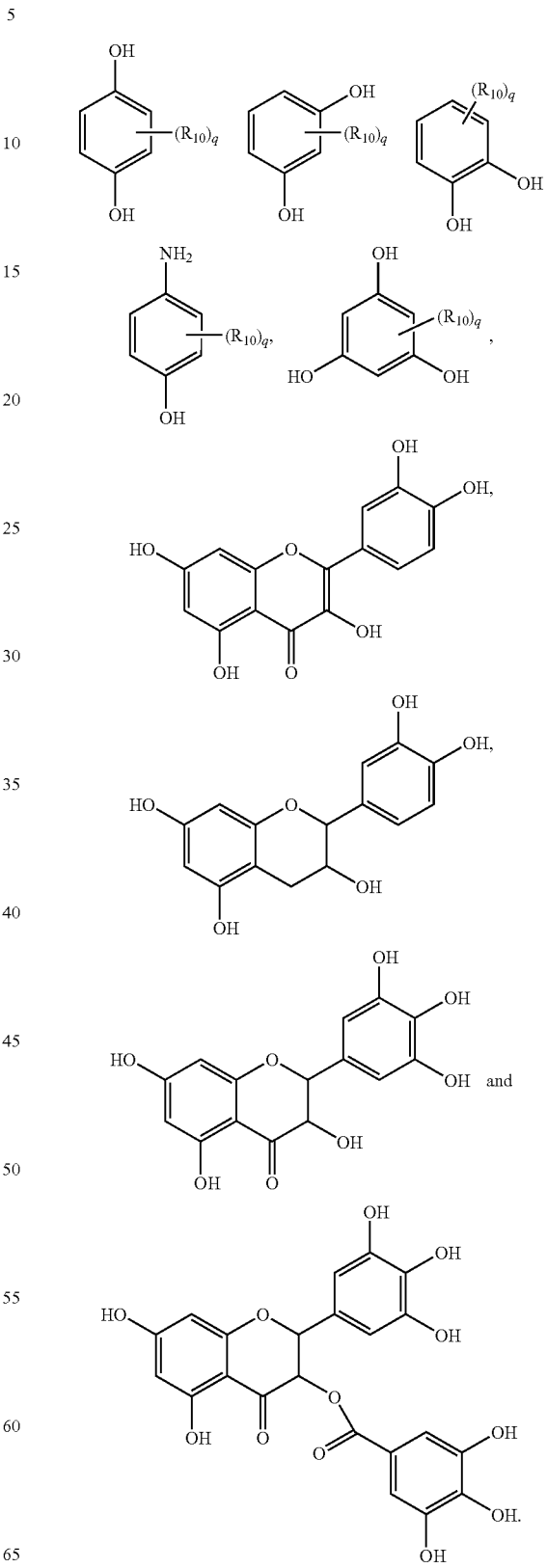

In all of the examples of monomers and polymers described herein the —OH groups can be replaced with OR, —NH₂, —NHR, —SH or —SR groups wherein R is as defined above.
In certain embodiments, examples of sterically hindered polymeric macromolecular antioxidant produced by the methods of the present invention comprises at least one repeat unit selected from:
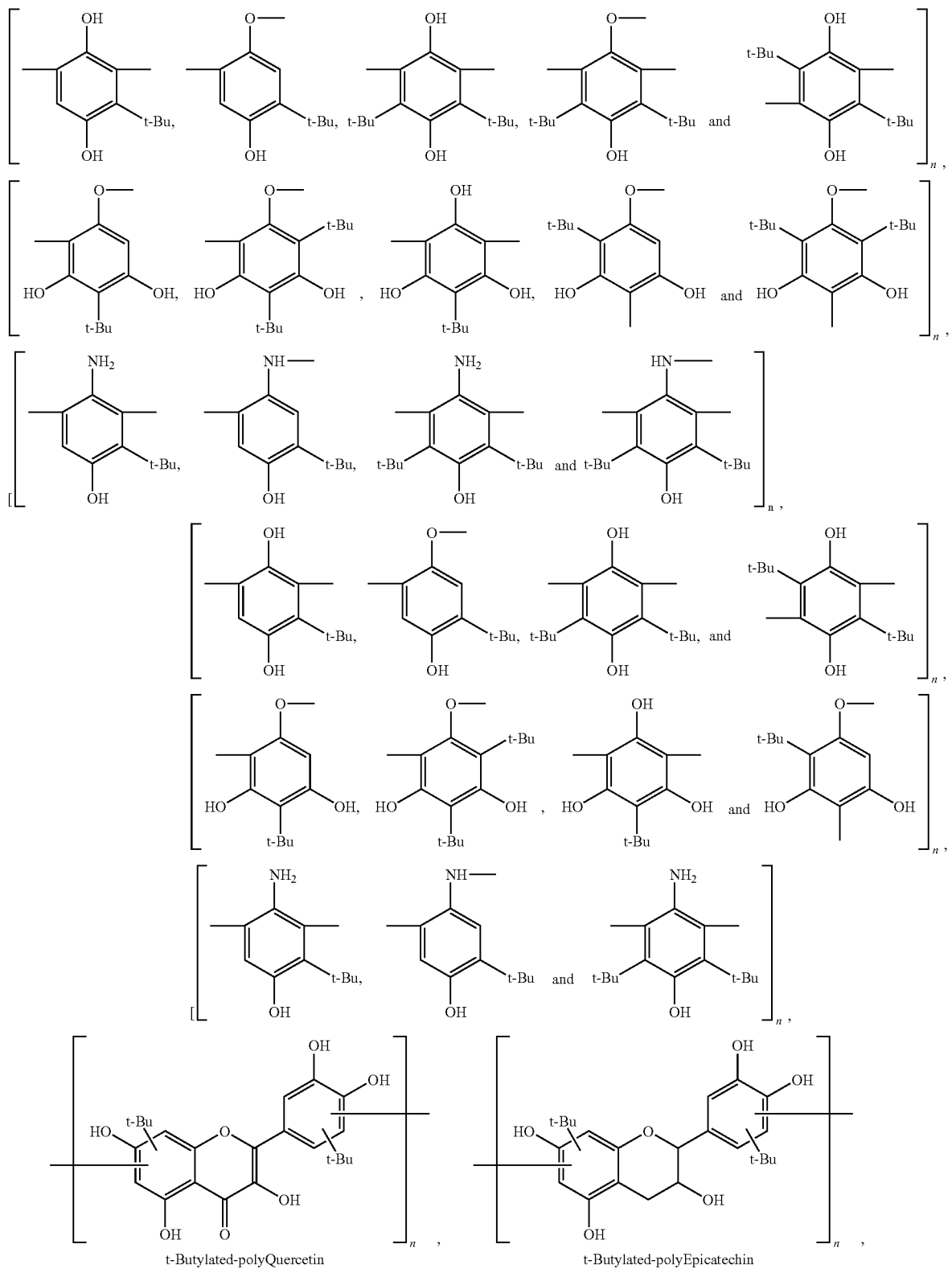

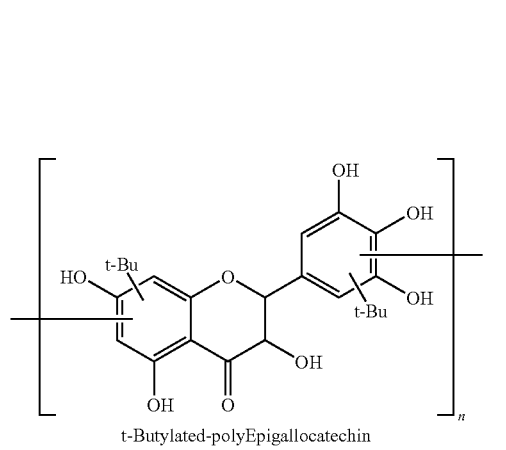

t-Butylated-polyEpigallocatechin and

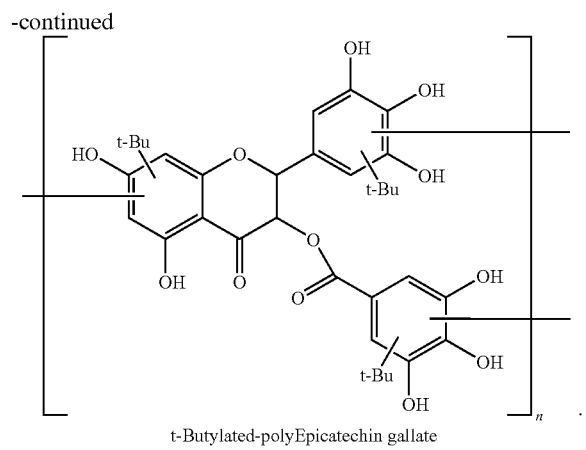

t-Butylated-polyEpicatechin gallate

The method comprises partially etherifying optionally substituted hydroquinone R with an alkyl halide, an alcohol or a corresponding olefin in the presence of appropriate catalysts. The resulting alkoxyphenol S is polymerized using a biocatalyst or biomimetic catalyst to produce a polymer represented by Structural Formula T. Finally the alkyl phenyl ether moieties in the resulting poly(alkoxyphenol) undergo a thermal rearrangement to the ortho positions in the presence of a rearrangement catalyst to give a polyalkylphenol antioxidant represented by Structural Formula U.

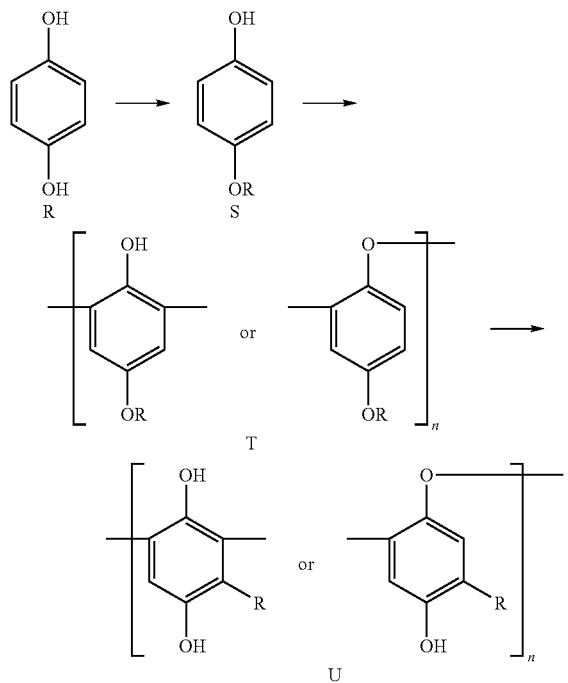

In Structural Formulas S, T, and U, n is an integer equal or greater than 2. R is a C1-C10 alkyl group, an aryl group, or a benzyl group. Typically, R is a tertiary alkyl group, or in preferred embodiments, a tertiary butyl group.

The invention provides an economical, process for preparing these antioxidant polymers.

In a preferred embodiment, the antioxidant polymer prepared by the method is represented by one or both of Structural Formulas (I) and (II):

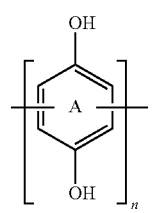
(I)

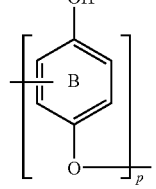
(II)

where:

Ring A is substituted with at least one tert-butyl group, and optionally one or more groups selected from the group consisting of a substituted or unsubstituted alkyl or aryl group, and a substituted or unsubstituted alkoxycarbonyl group;

Ring B is substituted with at least one —H and at least one tert-butyl group and optionally one or more groups selected from the group consisting of—a substituted or unsubstituted alkyl or aryl group, and a substituted or unsubstituted alkoxycarbonyl group;

n is an integer equal to or greater than 2; and p is an integer equal to or greater than 0.

In various embodiments, the alkyl groups substituting Rings A and B can be, for example, secondary and tertiary alkyl groups containing 3 to 10 carbon atoms, typically between 3 and 6. In some embodiments, the alkyl groups are tertiary butyl groups.

In various embodiments, the monomer for the polymerization can be formed, for example, by the etherification of hydroquinone, resorcinol and the like with an alkyl halide, an alcohol, an olefin and the like in the presence of appropriate catalysts.

In various embodiments, catalysts used for etherification can be, for example, acids, e.g. strong inorganic acids, a cationic exchange resin bearing sulfonic acid groups, metal halides, and other acids for the reaction of phenol with an alcohol or olefin; or bases, e.g., pyridine, aliphatic amines or other bases for the reaction of phenol with an alkyl halide.

In various embodiments, catalysts used for oxidative polymerization can be, for example, Iron(II)-salen, horseradish peroxidase (HRP), soybean peroxidase (SBP), hematin, and other peroxidase or biomimetic catalysts, and the like.

In various embodiments, catalysts used for rearranging alkoxyphenyl moieties in the poly(alkoxyphenol) to its isomeric ortho-alkyphenol moieties can be, for example, hydrofloride acid, alumina, silica gel, zeolites and the like.

Antioxidant polymers made by the methods of the present invention have two or more repeat units, preferably greater than about five repeat units. The molecular weight of the polymers disclosed herein can be generally selected to be appropriate for the desired application. Typically, the molecular weight can be greater than about 500 atomic mass units (amu) and less than about 2,000,000 amu, greater than about 1,000 amu and less than about 100,000 amu, greater than about 2,000 amu and less than about 10,000 amu, or greater than about 2,000 amu and less than about 5,000 amu. For food or edible products (e.g., products fit for human consumption), the molecular weight can be advantageously selected to be large enough so that an antioxidant polymer cannot be absorbed by the gastrointestinal tract, such as greater than 1,000 amu. For antioxidant polymers blended with a polymeric material, the molecule weight can be advantageously selected such that the rate of diffusion of the antioxidant polymer through the polymeric material can be slow relative to the expected lifetime of the polymeric material.

Antioxidant polymers made by the methods of the present invention can be either homopolymers or copolymers. A copolymer preferably contains two or more, or three or more, different repeating monomer units, each of which has varying or identical antioxidant properties. The identity of the repeat units in a copolymer can be chosen to modify the antioxidant properties of the polymer as a whole, thereby giving a polymer with tunable properties. The second, third and/or further repeat units in a copolymer can be either a synthetic or natural antioxidant.

Antioxidant polymers made by the methods of the present invention are typically insoluble in aqueous media. The solubility of the antioxidant polymers in non-aqueous media (e.g., oils) depends upon the molecular weight of the polymer, such that high molecular weight polymers are typically sparingly soluble in non-aqueous media. When an antioxidant polymer of the invention can be insoluble in a particular medium or substrate, it can be preferably well-mixed with that medium or substrate.

Antioxidant polymers of the present invention can be branched or linear, but are preferably linear. Branched antioxidant polymers can only be formed from benzene molecules having three or fewer substituents (e.g., three or more hydrogen atoms), as in Structural Formulas (XX), (XXI) and (XXIV).

Antioxidant polymers made by the methods of the present invention can be present in a wide variety of compositions where free radical mediated oxidation leads to deterioration of the quality of the composition, including edible products such as oils, foods (e.g., meat products, dairy products, cereals, etc.), and other products containing fats or other compounds subject to oxidation. Antioxidant polymers can also be present in plastics and other polymers, elastomers (e.g., natural or synthetic rubber), petroleum products (e.g., fossil fuels such as gasoline, kerosene, diesel oil, heating oil, propane, jet fuel), lubricants, paints, pigments or other colored items, soaps and cosmetics (e.g., creams, lotions, hair products). The antioxidant polymers can be used to coat a metal as a rust and corrosion inhibitor. Antioxidant polymers additionally can protect antioxidant vitamins (Vitamin A, Vitamin C, Vitamin E) and pharmaceutical products from degradation. In food products, the antioxidant polymers can prevent rancidity. In plastics, the antioxidant polymers can prevent the plastic from becoming brittle and cracking.

Antioxidant polymers of the present invention can be added to oils to prolong their shelf life and properties. These oils can be formulated as vegetable shortening or margarine. Oils generally come from plant sources and include cottonseed oil, linseed oil, olive oil, palm oil, corn oil, peanut oil, soybean oil, castor oil, coconut oil, safflower oil, sunflower oil, canola (rapeseed) oil and sesame oil. These oils contain one or more unsaturated fatty acids such as caproleic acid, palmitoleic acid, oleic acid, vaccenic acid, elaidic acid, brassidic acid, erucic acid, nervonic acid, linoleic acid, eleosteric acid, alpha-linolenic acid, gamma-linolenic acid, and arachidonic acid, or partially hydrogenated or trans-hydrogenated variants thereof. Antioxidant polymers of the present invention are also advantageously added to food or other consumable products containing one or more of these fatty acids.

The shelf life of many materials and substances contained within the materials, such as packaging materials, are enhanced by the presence of an antioxidant polymer of the present invention. The addition of an antioxidant polymer to a packaging material is believed to provide additional protection to the product contained inside the package. In addition, the properties of many packaging materials themselves, particularly polymers, are enhanced by the presence of an antioxidant regardless of the application (i.e., not limited to use in packaging). Common examples of packaging materials include paper, cardboard and various plastics and polymers. A packaging material can be coated with an antioxidant polymer (e.g., by spraying the antioxidant polymer or by applying as a thin film coating), blended with or mixed with an antioxidant polymer (particularly for polymers), or otherwise have an antioxidant polymer present within it. In one example, a thermoplastic such as polyethylene, polypropylene or polystyrene can be melted in the presence of an antioxidant polymer in order to minimize its degradation during the polymer processing. An antioxidant polymer can also be co-extruded with a polymeric material.

The term "alkyl" as used herein means a saturated straight-chain, branched or cyclic hydrocarbon. When straight-chained or branched, an alkyl group is typically C1-C8, more typically C1-C6; when cyclic, an alkyl group is typically C3-C12, more typically C3-C7 alkyl ester. Examples of alkyl groups include methyl, ethyl, n-propyl, iso-propyl, n-butyl, sec-butyl and tert-butyl and 1,1-dimethylhexyl.

The term "alkoxy" as used herein is represented by —OR, wherein R is an alkyl group as defined above.

The term "carbonyl" as used herein is represented by —C(=O)R, wherein R is an alkyl group as defined above.

The term "alkoxycarbonyl" as used herein is represented by —C(=O)OR, wherein R is an alkyl group as defined above.

The term "aromatic group" includes carbocyclic aromatic rings and heteroaryl rings. The term "aromatic group" may be used interchangeably with the terms "aryl", "aryl ring" "aromatic ring", "aryl group" and "aromatic group".

Carbocyclic aromatic ring groups have only carbon ring atoms (typically six to fourteen) and include monocyclic aromatic rings such as phenyl and fused polycyclic aromatic ring systems in which a carbocyclic aromatic ring is fused to one or more aromatic rings (carbocyclic aromatic or heteroaromatic)r. Examples include 1-naphthyl, 2-naphthyl, 1-anthracyl and 2-anthracyl. Also included within the scope of the term "carbocyclic aromatic ring", as it is used herein, is a group in which an aromatic ring is fused to one or more non-aromatic rings (carbocyclic or heterocyclic), such as in an indanyl, phthalimidyl, naphthimidyl, phenanthridinyl, or tetrahydronaphthyl.

The term "heteroaryl", "heteroaromatic", "heteroaryl ring", "heteroaryl group" and "heteroaromatic group", used alone or as part of a larger moiety as in "heteroaralkyl" refers to heteroaromatic ring groups having five to fourteen members, including monocyclic heteroaromatic rings and polycyclic aromatic rings in which a monocyclic aromatic ring is fused to one or more other aromatic ring (carbocyclic or heterocyclic). Heteroaryl groups have one or more ring heteroatoms. Examples of heteroaryl groups include 2-furanyl, 3-furanyl, N-imidazolyl, 2-imidazolyl, 4-imidazolyl, 5-imidazolyl, 3-isoxazolyl, 4-isoxazolyl, 5-isoxazolyl, oxadiazolyl, oxadiazolyl, 2-oxazolyl, 4-oxazolyl, 5-oxazolyl, N-pyrazolyl, 3-pyrazolyl, 4-pyrazolyl, 5-pyrazolyl, N-pyrrolyl, 2-pyrrolyl, 3-pyrrolyl, 2-pyridyl, 3-pyridyl, 4-pyridyl, 2-pyrimidinyl, 4-pyrimidinyl, 5-pyrimidinyl, 3-pyridazinyl, 4-pyridazinyl, 2-thiazolyl, 4-thiazolyl, 5-thiazolyl, triazolyl, tetrazolyl, 2-thienyl, 3-thienyl, carbazolyl, benzothienyl, benzofuranyl, indolyl, quinolinyl, benzothiazole, benzooxazole, benzimidazolyl, isoquinolinyl and isoindolyl. Also included within the scope of the term "heteroaryl", as it is used herein, is a group in which an aromatic ring is fused to one or more non-aromatic rings (carbocyclic or heterocyclic).

The term non-aromatic heterocyclic group used alone or as part of a larger moiety refers to non-aromatic heterocyclic ring groups having three to fourteen members, including monocyclic heterocyclcic rings and polycyclic rings in which a monocyclic ring is fused to one or more other non-aromatic carbocyclic or heterocyclic ring or aromatic ring (carbocyclic or heterocyclic). Heterocyclic groups have one or more ring heteroatoms, and can be saturated or unsaturated. Examples of heterocyclic groups include piperidinyl, piperizinyl, pyrrolidinyl, pyrazolidinyl, imidazolidinyl, tetrahydroquinolinyl, inodolinyl, isoindolinyl, tetrahydrofuranyl, oxazolidinyl, thiazolidinyl, dioxolanyl, dithiolanyl, tetrahydropyranyl, dihydropyranyl, azepanyl aNd azetidinyl The term "heteroatom" means nitrogen, oxygen, or sulfur and includes any oxidized form of nitrogen and sulfur, and the quaternized form of any basic nitrogen. Also the term "nitrogen" includes a substitutable nitrogen of a heteroaryl or non-aromatic heterocyclic group. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl) or NR" (as in N-substituted pyrrolidinyl), wherein R" is a suitable substituent for the nitrogen atom in the ring of a non-aromatic nitrogen-containing heterocyclic group, as defined below.

As used herein the term non-aromatic carbocyclic ring as used alone or as part of a larger moiety refers to a non-aromatic carbon containing ring which can be saturated or unsaturated having three to fourteen atoms including monocyclic and polycyclic rings in which the carbocyclic ring can be fused to one or more non-aromatic carbocyclic or heterocyclic rings or one or more aromatic (carbocyclic or heterocyclic) rings An optionally substituted aryl group as defined herein may contain one or more substitutable ring atoms, such as carbon or nitrogen ring atoms. Examples of suitable substituents on a substitutable ring carbon atom of an aryl group include halogen (e.g., —Br, Cl, I and F), —OH, C1-C3 alkyl, C1-C3 haloalkyl, —NO$_2$, C1-C3 alkoxy, C1-C3 haloalkoxy, —CN, —NH$_2$, C1-C3 alkylamino, C1-C3 dialkylamino, —C(O)NH$_2$, —C(O)NH(C1-C3 alkyl), —C(O)(C1-C3 alkyl), —OC(O)(C1-C3 alkyl), —OC(O)(aryl), —OC(O)(substituted aryl), —OC(O)(aralkyl), —OC(O)(substituted aralkyl), —NHC(O)H, —NHC(O)(C1-C3 alkyl), —C(O)N(C1-C3 alkyl)$_2$, —NHC(O)O—(C1-C3 alkyl), —C(O)OH, —C(O)O—(C1-C3 alkyl), —NHC(O)NH$_2$, —NHC(O)NH(C1-C3 alkyl), —NHC(O)N(C1-C3 -alkyl)$_2$, —NH—C(=NH)NH$_2$, —SO$_2$NH$_2$—SO$_2$NH(C1-C3alkyl), —SO$_2$N(C1-C3alkyl)$_2$, NHSO$_2$H, NHSO$_2$(C1-C3 alkyl) and optionally substituted aryl. Preferred substituents on aryl groups are as defined throughout the specification. In certain embodiments aryl groups are unsubstituted.

Examples of suitable substituents on a substitutable ring nitrogen atom of an aryl group include C1-C3 alkyl, NH$_2$, C1-C3 alkylamino, C1-C3 dialkylamino, —C(O)NH$_2$, —C(O)NH(C1-C3 alkyl), —C(O)(C1-C3 alkyl), —CO$_2$R, —C(O)C(O)R, —C(O)CH$_3$, —C(O)OH, —C(O)O—(C1-C3 alkyl), —SO$_2$NH$_2$—SO$_2$NH(C1-C3alkyl), —SO$_2$N(C1-C3alkyl)$_2$, NHSO$_2$H, NHSO$_2$(C1-C3 alkyl), —C(=S)NH$_2$, —C(=S)NH(C1-C3 alkyl), —C(=S)N(C1-C3 alkyl)$_2$, —C(=NH)—N(H)$_2$, —C(=NH)—NH(C1-C3 alkyl) and —C(=NH)—N(C1-C3 alkyl)$_2$, An optionally substituted alkyl group or non-aromatic carbocyclic or heterocyclic group as defined herein may contain one or more substituents. Examples of suitable substituents for an alkyl group include those listed above for a substitutable carbon of an aryl and the following: =O, =S, =NNHR, =NN(R)$_2$, =NNHC(O)R, =NNHCO$_2$(alkyl), =NNHSO$_2$(alkyl), =NR, spiro cycloalkyl group or fused cycloalkyl group. R** in each occurrence, independently is —H or C1-C6 alkyl. Preferred substituents on alkyl groups are as defined throughout the specification. In certain embodiments optionally substituted alkyl groups are unsubstituted.

Further examples of suitable substituents on an alkyl, aryl or acyl group may include, for example, halogen (—Br, —Cl, —I and —F), —OR$_a$, —CN, —NO$_2$, —N(R$_a$)$_2$, —COOR$_a$, —CON(R$_a$)$_2$, —SO$_k$R$_a$ (k is 0, 1 or 2) and —NH—C(=NH)—NH$_2$. An alkyl group can also have =O or =S as a substituent. Each R$_a$ is independently —H, an alkyl group, a substituted alkyl group, a benzyl group, a substituted benzyl group, an aryl group or a substituted aryl group. A substituted benzylic group or aryl group can also have an alkyl or substituted alkyl group as a substituent. A substituted alkyl group can also have a benzyl, substituted benzyl, aryl or substituted aryl group as a substituent. A substituted alkyl, substituted aryl or substituted acyl group can have more than one substituent.

A "spiro cycloalkyl" group is a cycloalkyl group which shares one ring carbon atom with a carbon atom in an alkylene group or alkyl group, wherein the carbon atom being shared in the alkyl group is not a terminal carbon atom.

Without wishing to be bound by any theory or limited to any mechanism it is believed that macromolecular antioxidants and polymeric macromolecular antioxidants of the present invention exploit the differences in activities (ks, equilibrium constant) of, for example, homo- or hetero-type antioxidant moieties. Antioxidant moieties include, for example, hindered phenolic groups, unhindered phenolic groups, aminic groups and thioester groups, etc. of which there can be one or more present in each macromolecular antioxidant molecule. As used herein a homo-type antioxidant macromolecule comprises antioxidant moieties which are all same, for example, hindered phenolic, —OH groups. As used herein a hetero-type antioxidant macromolecule comprises at least one different type of moiety, for example, hindered phenolic and aminic groups in the one macromolecule.

This difference in activities can be the result of, for example, the substitutions on neighboring carbons or the local chemical or physical environment (for example, due to electrochemical or stereochemical factors) which can be due in part to the macromolecular nature of molecules.

In one embodiment of the present invention, a series of macromolecular antioxidant moieties of the present invention with different chemical structures can be represented by W1H, W2H, W3H, . . . to WnH. In one embodiment of the present invention, two types of antioxidant moieties of the present invention can be represented by: W1H and W2H. In certain embodiments W1H and W2H can have rate constants of k1 and k2 respectively. The reactions involving these moieties and peroxyl radicals can be represented as:

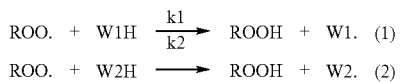

where ROO. is a peroxyl radical resulting from, for example, initiation steps involving oxidation activity, for example:

In one particular embodiment of the present invention k1>>k2 in equations (1) and (2). As a result, the reactions would take place in such a way that there is a decrease in concentration of W1. free radicals due their participation in the regeneration of active moiety W2H in the molecule according equation (5):

This transfer mechanism may take place either in intra- or inter-molecular macromolecules. The transfer mechanism (5) could take place between moieties residing on the same macromolecule (intra-type) or residing on different macromolecules (inter-type).

In certain embodiments of the present invention, the antioxidant properties described immediately above (equation 5) of the macromolecular antioxidants and polymeric macromolecular antioxidants of the present invention result in advantages including, but not limited to:

a) Consumption of free radicals W1. according to equation (5) can result in a decrease of reactions of W1. with hydroperoxides and hydrocarbons (RH).

b) The regeneration of W1H provides extended protection of materials. This is a generous benefit to sacrificial type of antioxidants that are used today. Regeneration of W1H assists in combating the oxidation process The increase in the concentration of antioxidant moieties W1H (according to equation 5) extends the shelf life of materials.

In certain embodiments of the present invention, the following items are of significant interest for enhanced antioxidant activity in the design of the macromolecular antioxidants and polymeric macromolecular antioxidants of the present invention:

a) The activity of proposed macromolecular antioxidant is dependent on the regeneration of W1H in equation (5) either through inter- or intra-molecular activities involving homo- or hetero-type antioxidant moieties.

b) Depending on the rates constants of W1H and W2H it is possible to achieve performance enhancements by many multiples and not just incremental improvements.

In certain embodiments of the present invention, more than two types of antioxidant moieties with different rate constants are used in the methods of the present invention.

The entire contents of each of the following are incorporated herein by reference.

Docket No.: 3805.1001-000; Provisional Patent Application No.: 60/633,197, filed Dec. 3, 2004, Title: Synthesis Of Sterically Hindered Phenol Based Macromolecular Antioxidants, by Ashish Dhawan, et al.;

Docket No.: 3805.1001-001; filed Dec. 2, 2005, Title: Synthesis Of Sterically Hindered Phenol Based Macromolecular Antioxidants, by Ashish Dhawan, et al.;

Docket No.: 3805.1002-000; Provisional Patent Application No.: 60/633,252, filed Dec. 3, 2004, Title: One Pot Process For Making Polymeric Antioxidants, by Vijayendra Kumar, et al.;

Docket No.: 3805.1002-001; filed Dec. 2, 2005, Title: One Pot Process For Making Polymeric Antioxidants, by Vijayendra Kumar, et al.;

Docket No.: 3805.1003-000; Provisional Patent Application No.: 60/633,196, filed Dec. 3, 2004, Title: Synthesis Of Aniline And Phenol-Based Macromonomers And Corresponding Polymers, by Rajesh Kumar, et al.;

Docket No.: 3805.1003-001; filed Dec. 2, 2005, Title: Synthesis Of Aniline And Phenol-Based Macromonomers And Corresponding Polymers, by Rajesh Kumar, et al.;

Docket No.: 3805.1004-002; patent application Ser. No. 11/184,724, filed Jul. 19, 2005, Title: Anti-Oxidant Macromonomers And Polymers And Methods Of Making And Using The Same, by Ashok L. Cholli;

Docket No.: 3805.1004-005; patent application Ser. No. 11/184,716, filed Jul. 19, 2005, Title: Anti-Oxidant Macromonomers And Polymers And Methods Of Making And Using The Same, by Ashok L. Cholli;

Docket No.: 3805.1005-000; Provisional Patent Application No.: 60/655,169, filed Feb. 22, 2005, Title: Nitrogen And Hindered Phenol Containing Dual Functional Macromolecules: Synthesis And Their Antioxidant Performances In Organic Materials, by Rajesh Kumar, et al.

Docket No.: 3805.1006-000; Provisional Patent Application No.: 60/655,169, filed Mar. 25, 2005, Title: Alkylated Macromolecular Antioxidants And Methods Of Making, And Using The Same, by Rajesh Kumar, et al.

Docket No.: 3805.1007-000; Provisional Patent Application No.: 60/731,125, filed Oct. 27, 2005, Title: Macromolecular Antioxidants And Polymeric Macromolecular Antioxidants, by Ashok L. Cholli, et al.

Docket No.: 3805.1008-000; Provisional Patent Application No.: 60/731,021, filed Oct. 27, 2005, Title: Macromolecular Antioxidants Based On Sterically Hindered Phenols And Phosphites, by Ashok L. Cholli, et al.

Docket No.: 3805.1009-000; Provisional Patent Application, filed Dec. 2, 2005, Title: Lubricant Composition, by Kumar, Rajesh, et al.

Docket No.: 3805.1010-000; Provisional Patent Application No. 60/731,325, filed Oct. 27, 2005, Title: Stabilized Polyolefin Composition, by Kumar, Rajesh, et al.

Docket No.: 0813.2006-003; patent application Ser. No. 11/040,193, filed Jan. 21, 2005, Title: Post-Coupling Synthetic Approach For Polymeric Antioxidants, by Ashok L. Choll, et al.;

Docket No.: 0813.2006-002; Patent Application No.: PCT/US2005/001948, filed Jan. 21, 2005, Title: Post-Coupling Synthetic Approach For Polymeric Antioxidants, by Ashok L. Cholli et al.;

Docket No.: 0813.2002-008; Patent Application No.: PCT/US2005/001946, filed Jan. 21, 2005, Title: Polymeric Antioxidants, by Ashok L. Choll, et al.;

Docket No.: 0813.2002-006; Patent Application No.: PCT/US03/10782, filed Apr. 4, 2003, Title: Polymeric Antioxidants, by Ashok L. Choll, et al.;

Docket No.: 0813.2002-004; patent application Ser. No. 10/761,933, filed Jan. 21, 2004, Title: Polymeric Antioxidants, by Ashish Dhawan, et al.;

Docket No.: 0813.2002-001; patent application Ser. No. 10/408,679, filed Apr. 4, 2003, Title: Polymeric Antioxidants, by Ashok L. Choll, et al.;

Tertiary Butoxy Derivatives of Phenol. (Jan Pospisil and Ludek Taimr). (1964), 2 pp. CS 111291

A New Synthesis of aryl tert-butyl Ethers. Masada, Hiromitsu; Oishi, Yutaka. Fac. Eng., Kanazawa Univ., Kanazawa, Japan. Chemistry Letters (1978), (1), 57-8.

Simple Synthesis of the tert-butyl Ether of Phenol. Ol'dekop, Yu. A.; Maier, N. A.; Erdman, A. A.; Shirokii, V. L.; Zubreichuk, Z. P.; Beresnevich, L. B. Inst. Fiz.-Org. Khim., Minsk, USSR. Zhumal Obshchei Khimii (1980), 50(2), 475-6.

New Method for the Williamson Ether Synthesis Using tert-alkyl Halides in Nonpolar Solvents. Masada, Hiromitsu; Mikuchi, Fumio; Doi, Yasuo; Hayashi, Akira. Dep. Chem. Chem. Eng., Kanazawa Univ., Kanazawa, Japan. Nippon Kagaku Kaishi (1995), (2), 164-6.

New Heterogeneous Williamson Synthesis of Ethers Using tert-alkyl Substrates. Masada, Hiromitsu; Doi, Yasuo; Mikuchi, Fumio; Keiko, Kigoshi. Faculty Eng., Kanazawa Univ., Kanazawa, Japan. Nippon Kagaku Kaishi (1996), (3), 275-82.

Preparation of Aromatic Tertiary Ethers. Tanaka, Masato; Reddy, Nagaveri Prabacal. (Agency of Industrial Sciences and Technology, Japan). Jpn. Kokai Tokkyo Koho (1999), 3 pp. JP 080063.

Preparation of Aromatic Ethers. Watanabe, Makoto; Koie, Yasuyuki. (Tosoh Corp., Japan). Jpn. Kokai Tokkyo Koho (1999), 10 pp. JP 11158103.

o-Alkylated phenols. Firth, Bruce E.; Rosen, Terry J. (UOP Inc., USA). U.S. Pat. No. 4,447,657 (1984), 4 pp.

2-Tert-Butyl-4-alkoxy- and -4-hydroxyphenols. Firth, Bruce E.; Rosen, Terry J. (UOP Inc., USA). U.S. Pat. No. 4,465,871 (1984), 4 pp.

Conversion of Alkyl Phenyl Ether to Alkylphenol. Klicker, James D. (Borg-Warner Corp., USA). U.S. Pat. No. 4,283,572 (1981), 3 pp.

O. N. Tsevktov, K. D. Kovenev, *Int. J. Chem. Eng.* 6 (1966), 328.

Sartori Giovanni, Franca Bigi et al., *Chem. Ind.* (London), 1985 (22) 762-763.

V. A. Koshchii, Ya. B Kozlikovskii, A. A Matyusha, Zh. *Org. Khim.* 24(7), 1988, 1508-1512.

Gokul K. Chandra, M. M. Sharma, *Catal. Lett.* 19(4), 1993, 309-317.

Sakthivel, Ayyamperumal; Saritha, Nellutla; Selvam, Parasuraman, *Catal. Lett.* 72(3), 2001, 225-228.

V. Quaschning, J. Deutsch, P. Druska, H. J. Niclas and E. Kemnitz. *J. Catal.* 177 (1998), p. 164.

S. K. Badamali, S. Sakthivel and P. Selvam. *Catal. Today* 63 (2000), p. 291.

A. Heidekum, M. A. Hamm and F. Hoelderich. *J. Catal.* 188 (1999), p. 230.

Y. Kamitori, M. Hojo, R. Matsuda, T. Izumi and S. Tsukamoto. *J. Org. Chem.* 49 (1984), p. 4165.

E. Armengol, A. Corma, H. Garcia and J. Primo. *Appl. Catal. A* 149 (1997), p. 411.

J. M. Lalancette, M. J. Fournier and R. Thiffault. *Can. J. Chem.* 52 (1974), p. 589.

Japanese Patent No. JP 145002980, 1970.

Japanese Patent No. 44028850, 1969.

Japanese Patent No. 44024274, 1969.

EXEMPLIFICATION

The formation of macromolecular antioxidant are illustrated with following examples.

Example 1

Preparation of 4-(tert-butoxy)phenol

A mixture of 14.0 g of tert-butylbromide, 11.0 g of hydroquninone, 8 g of pyridine and 50 ml acetonitrile was stirred for 10 days at room temperature. The solvent was removed by evaporation. The residue was washed with water three times to give 5.7 g of white crystalline product with melting point 152-4° C. $^1$H NMR (CDCl$_3$): δ 6.82-6.93 (m, 2H), 6.67-6.77 (m, 2H), 4.75 (s, 1H), 1.31 (s, 9H); $^{13}$C NMR (CDCl$_3$): δ 151.88, 148.78, 125.74, 115.52, 78.36, and 28.89.

Example 2

Preparation of poly(4-(tert-butoxy)phenol)

A mixture of 1.5 g of 4-(tert-butoxy)phenol, 60 ml tetrahydrofuran and 0.1 g of Fe-salen was stirred at room temperature. Hydrogen peroxide solution (1.5 ml 50% $H_2O_2$ water solution and 6 ml $H_2O$) was added dropwise to the mixture for two hours and the reaction was kept going at room temperature for 24 hours. The solvent was removed by evaporation. The residue was dissolved in 10 ml acetone and added into acidic ice water (PH=3). The precipitate was collected by filtration and dried to give brown powder product. Yield: 1.15 g.

Example 3

Preparation of poly(4-tert-butyl hydroquinone)

A. Preparation of Thermal-Rearrangement Catalyst 10 gram alumina is added into 50 ml 1 M NH$_4$F water solution and the mixture is stirred for 2 hours. Then the precipitate is collected by filtration and dried at 200° C. for 24 hours to give fluorided alumina thermal-rearrangement catalyst.

B. Preparation of poly(4-tert-butyl hydroquinone)

A mixture of 1 g of poly(4-(tert-butoxy)phenol), 0.5 g of fluorided alumina and 100 ml xylene is stirred and heated to reflux for 24 hours. The mixture is cooled down to room temperature and filtrated. The filtrate is concentrated to 10 ml by evaporation and added dropwise to ice water. The precipitate is collected by filtration and dried.

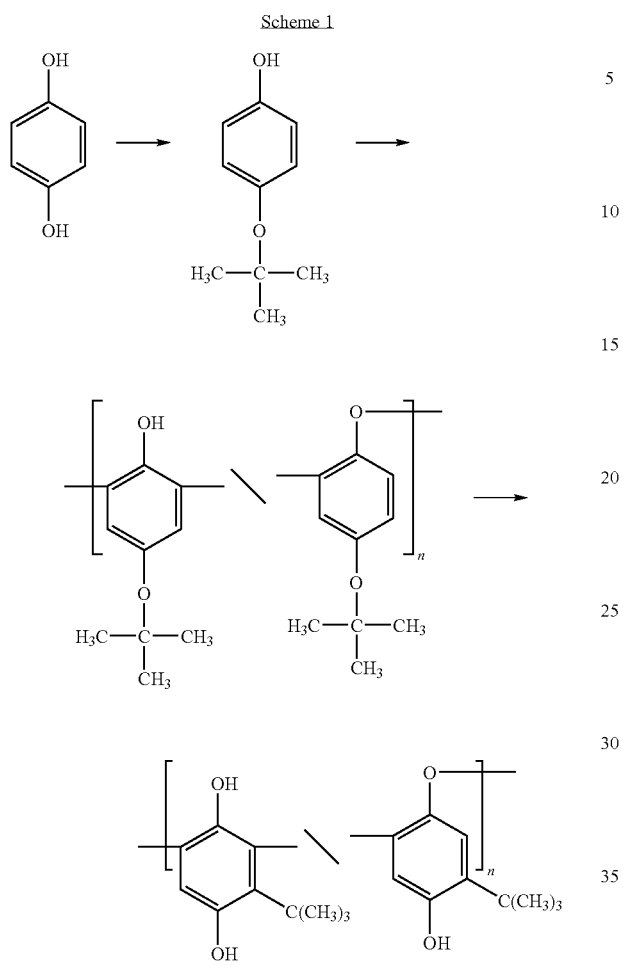

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of synthesizing an antioxidant polymer, comprising the steps of
a) partially etherifying a phenol derivative represented by the following structural formula:

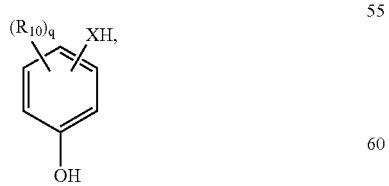

wherein:
at least one ring carbon atom substituted with an —OH group is adjacent to one unsubstituted ring carbon atom;

X is —O—, —NH— or —S—;

each $R_{10}$ is independently an optionally substituted C1-C10 alkyl group, an optionally substituted aryl group, and optionally substituted alkoxy group, an optionally substituted carbonyl group, an optionally substituted alkoxycarbonyl group, an optionally substituted aryloxycarbonyl group, —OH, —SH or —NH$_2$; or two $R_{10}$ groups on adjacent carbon atoms join together to form an optionally substituted aromatic ring or an optionally substituted carbocyclic or heterocyclic non-aromatic ring; and q is an integer from 0 to 2;

by contacting the phenol derivative with an alkyl halide, alcohol or olefin to produce an alkoxy phenol derivative represented by the following structural formula:

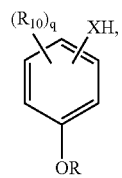

R is an optionally substituted C1-C10 alkyl group;
b) polymerizing the alkoxy phenol derivative to produce an alkoxy phenol polymer comprising at least one repeat unit selected from:

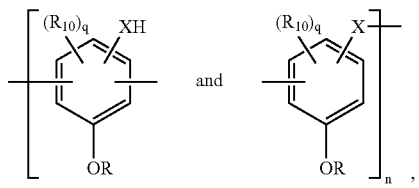

n is an integer greater than or equal to 2; and
c) thermally rearranging the alkyl portion of the alkoxy group of the polymer repeat units to the adjacent ring carbon atom to give a polymeric alkyl phenol derivative antioxidant comprising at least one repeat unit selected from:

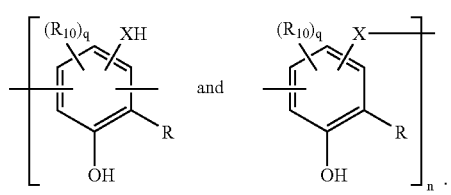

2. The method of claim 1, wherein the phenol derivative is represented by one of the following structural formulas:

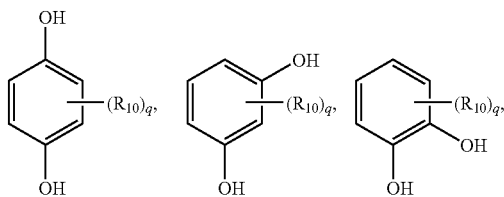

3. The method of claim 2, wherein the phenol derivative is represented by one of the following structural formulas:

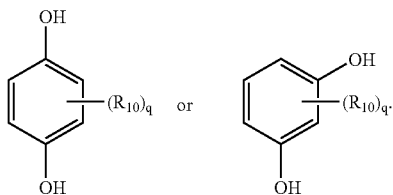

4. The method of claim 3, wherein the etherification in step a) is carried out in the presence of an alkyl halide and a catalyst selected from pyridine, triethyl amine, trimethyl amine, or diethyl amine.

5. The method of claim 3, wherein the etherification in step a) is carried out in the presence of an alcohol or an olefin and a catalyst selected from the group comprising an inorganic acid and a cationic exchange resin bearing sulfonic acid groups or metal halides.

6. The method of claim 3, wherein the polymerization in step b) is carried out in the presence of a biocatalyst or biomimetic catalyst.

7. The method of claim 6, wherein the biocatalyst or biomimetic catalyst is selected from Iron(II)-salen complexes, horseradish peroxidase, soybean peroxidase, hematin, laccase, tyroniase, or a tyroniase—model complex.

8. The method of claim 3, wherein the thermal rearrangement in step c) is carried out in the presence of catalyst selected from hydrofluoric acid, silica gel or zeolites.

9. The method of claim 3, wherein sterically hindered polymeric macromolecular antioxidant produced in step c) comprises at least one repeat unit selected from:

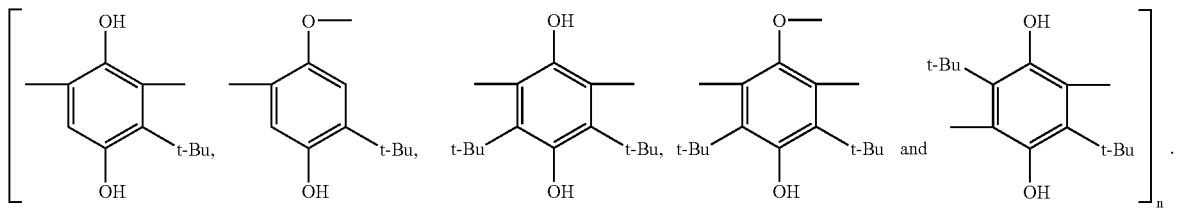

10. The method of claim 2, wherein the phenol derivative is represented by the following structural formula:

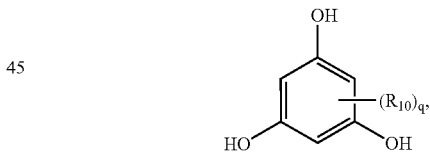

wherein:
q is 0 or 1.

11. The method of claim 10, wherein sterically hindered polymeric macromolecular antioxidant produced in step c) comprises at least one repeat unit selected from:

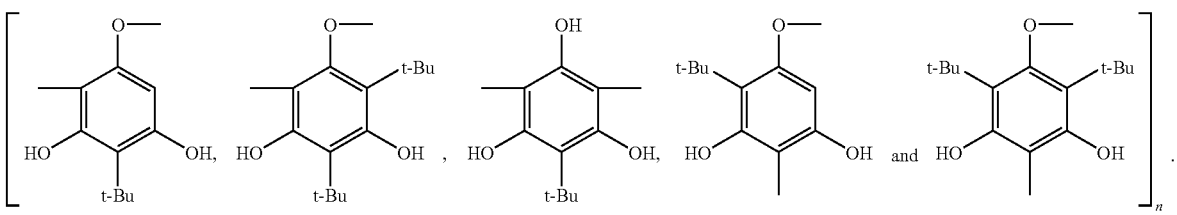

12. The method of claim 2, wherein sterically hindered polymeric macromolecular antioxidant produced in step c) comprises at least one repeat unit selected from:

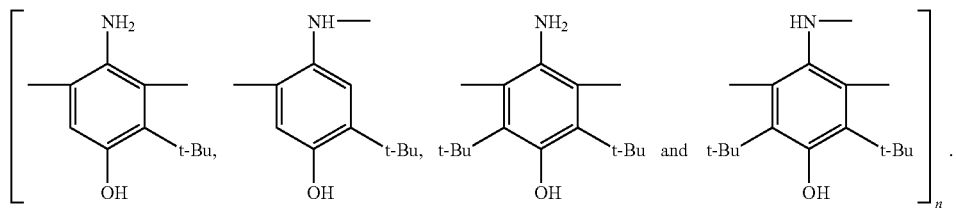

13. The method of claim 1, wherein each $R_{10}$ is independently c1-c10 alkyl, —OH, —SH or —NH$_2$, or two $R_{10}$ groups on adjacent carbon atoms join together to form an optionally substituted aromatic ring or an optionally substituted carbocyclic or heterocyclic non-aromatic ring.

14. The method of claim 13, wherein the phenol derivative is represented by the following structural formula:

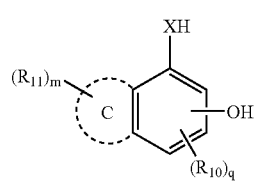

wherein:
  Ring C is a five or six membered aromatic or carbocyclic or heterocyclic non-aromatic ring;
  each $R_{10}$ is independently C1-C10 alkyl group, —OH, —SH or —NH$_2$;
  $R_{11}$ is =O, —OH, C1-C3 alkyl, optionally substituted aryl, —OC(O)(C1-C3 alkyl), —OC(O)(aryl), —OC(O)(substituted aryl), —OC(O)(aralkyl), or —OC(O)(substituted aralkyl);
  q is 0 or 1; and
  m is an integer from 0 to 3.

15. The method of claim 14, wherein Ring C is a non-aromatic heterocyclic ring.

16. The method of claim 15, wherein Ring C is tetrahydropyranyl or dihydropyranyl.

17. The method of claim 16, wherein the phenol derivative is represented by the following structural formula:

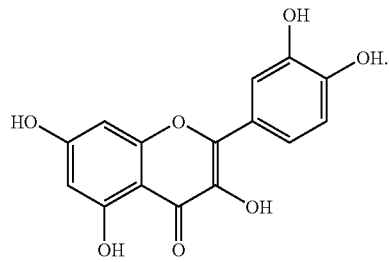

18. The method of claim 16, wherein the phenol derivative is represented by the following structural formula:

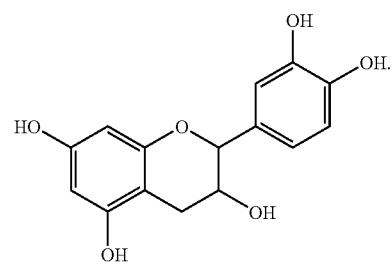

19. The method of claim 16, wherein the phenol derivative is represented by the following structural formula:

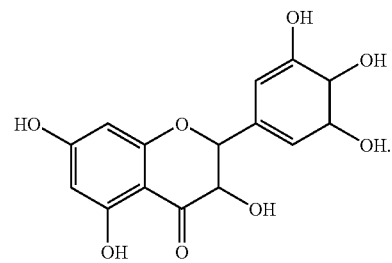

20. The method of claim 16, wherein the phenol derivative is represented by the following structural formula:

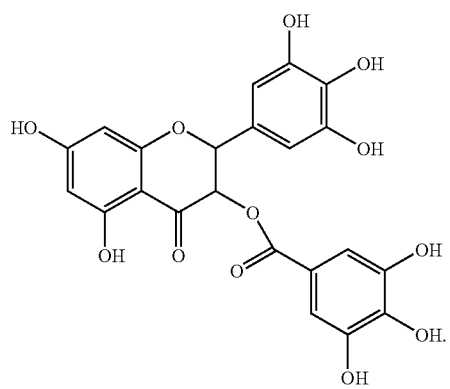

* * * * *

UNITED STATES PATENT AND TRADEMARK OFFICE
CERTIFICATE OF CORRECTION

PATENT NO. : 7,678,877 B2
APPLICATION NO. : 11/292813
DATED : March 16, 2010
INVENTOR(S) : Suizhou Yang and Ashok L. Cholli It is certified that error appears in the above-identified patent and that said Letters Patent is hereby corrected as shown below:

Insert the following structures in claim 2 after the first structure:

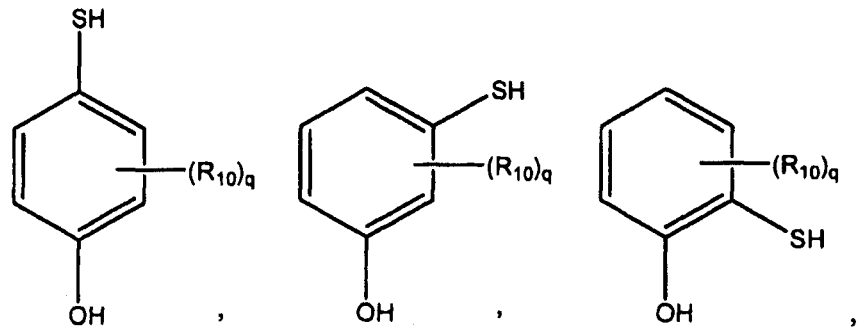

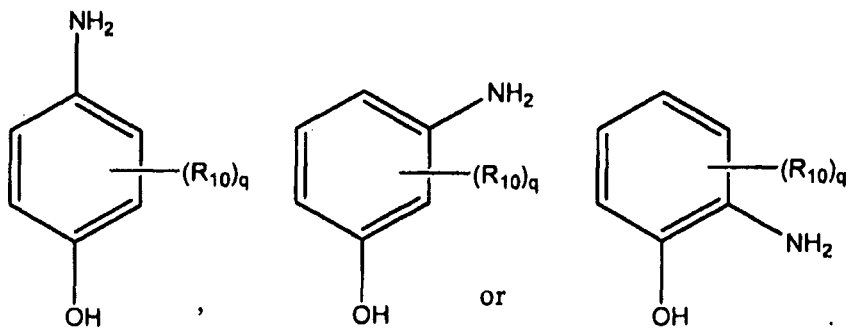

--                                                                    --

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,678,877 B2  Page 1 of 1
APPLICATION NO. : 11/292813
DATED : March 16, 2010
INVENTOR(S) : Suizhou Yang and Ashok L. Cholli It is certified that error appears in the above-identified patent and that said Letters Patent is hereby corrected as shown below:

Column 35, line 13, Insert the following structures in claim 2 after the first structure:

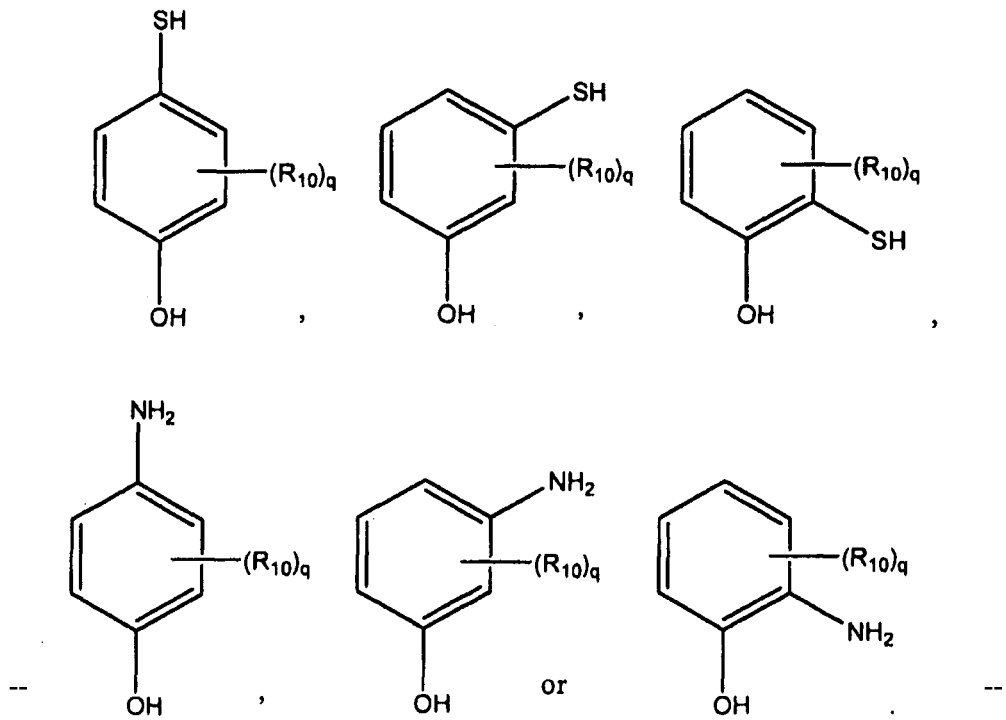

This certificate supersedes the Certificate of Correction issued May 18, 2010.

Signed and Sealed this

Fifteenth Day of June, 2010

David J. Kappos
*Director of the United States Patent and Trademark Office*